United States Patent
Hitaka et al.

(10) Patent No.: US 8,149,246 B2
(45) Date of Patent: Apr. 3, 2012

(54) DIGITAL DOCUMENT EDITING METHOD, DIGITAL DOCUMENT EDITING PROGRAM AND DIGITAL DOCUMENT EDITING APPARATUS

(75) Inventors: Yosato Hitaka, Ohta-ku (JP); Toshiyuki Noguchi, Ohta-ku (JP); Shigeyuki Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/069,960

(22) Filed: Mar. 23, 2011

(65) Prior Publication Data

US 2011/0173531 A1   Jul. 14, 2011

Related U.S. Application Data

(63) Continuation of application No. 11/216,130, filed on Sep. 1, 2005, now Pat. No. 7,940,284.

(30) Foreign Application Priority Data

Sep. 3, 2004 (JP) ................................ 2004-257256
Sep. 3, 2004 (JP) ................................ 2004-257257

(51) Int. Cl.
*G09G 5/00* (2006.01)
(52) U.S. Cl. ........................................ 345/619; 382/309
(58) Field of Classification Search .................. 345/619; 382/309
See application file for complete search history.

(56) References Cited

U.S. PATENT DOCUMENTS

| 6,111,586 | A | 8/2000 | Ikeda et al. |
| 6,400,853 | B1 | 6/2002 | Shilyama |
| 6,654,135 | B2 | 11/2003 | Mitani |
| 7,441,182 | B2 | 10/2008 | Beilinson et al. |
| 7,486,807 | B2 | 2/2009 | Ngahashi |
| 2003/0051207 | A1 | 3/2003 | Kobayashi et al. |
| 2003/0063131 | A1* | 4/2003 | Ma .................................. 345/838 |
| 2003/0076364 | A1 | 4/2003 | Martinez et al. |
| 2003/0123853 | A1 | 7/2003 | Iwahara et al. |
| 2003/0174217 | A1* | 9/2003 | Kito et al. .................. 348/231.2 |

(Continued)

FOREIGN PATENT DOCUMENTS

CA    2404126    3/2004
(Continued)

OTHER PUBLICATIONS

"Recycle Bin (Windows)," Wikipedia, http.:/en.wikipedia.org/wiki/Recycle_Bin_(Windows), 3 sheets.

(Continued)

*Primary Examiner* — Xiao M. Wu
*Assistant Examiner* — Maurice L McDowell, Jr.
(74) *Attorney, Agent, or Firm* — Fitzpatrick, Cella, Harper & Scinto

(57) ABSTRACT

The invention relates to an editing of a digital document containing an image, a text, a pattern and the like on pages constituting the digital document. In response to an operation for deleting an image positioned in a page, such image is not added to another page but is moved to and displayed in an evacuation area provided independently from the page area. In the evacuation area, such image is displayed together with a serial number of the page in which such image was present originally. Thus the page layout is not destructed in pages other than the page of image deletion, and the user can easily confirm later the image existed in such page.

7 Claims, 27 Drawing Sheets

U.S. PATENT DOCUMENTS

| | | |
|---|---|---|
| 2003/0227468 A1 | 12/2003 | Takeda |
| 2004/0001107 A1 | 1/2004 | Russon |
| 2004/0120004 A1 | 6/2004 | Okamoto et al. |
| 2005/0060665 A1 | 3/2005 | Rekimoto |
| 2005/0102629 A1 | 5/2005 | Chen et al. |
| 2005/0240869 A1 | 10/2005 | Leetaru et al. |

FOREIGN PATENT DOCUMENTS

| | | |
|---|---|---|
| JP | 2000-253228 | 9/2000 |
| JP | 2000-353255 | 12/2000 |
| JP | 2001-74455 | 3/2001 |
| JP | 2003-51934 | 2/2003 |
| JP | 2003-60903 | 2/2003 |
| JP | 2003-134425 | 5/2003 |
| JP | 2004-13575 | 1/2004 |
| JP | 2004-201051 | 7/2004 |
| JP | 2004-234228 | 8/2004 |
| WO | 2004/055696 | 7/2004 |

OTHER PUBLICATIONS

European Communication and Search Report, dated Nov. 27, 2008, regarding Application No. 05255400.3-1527/1632869.

"Recycle Bin (Windows)," Wikipedia, http.:/en.wikipedia.org/wiki/Recycle_Bin_(Windows), 3 sheets, version that was last modified on Dec. 12, 2008.

* cited by examiner

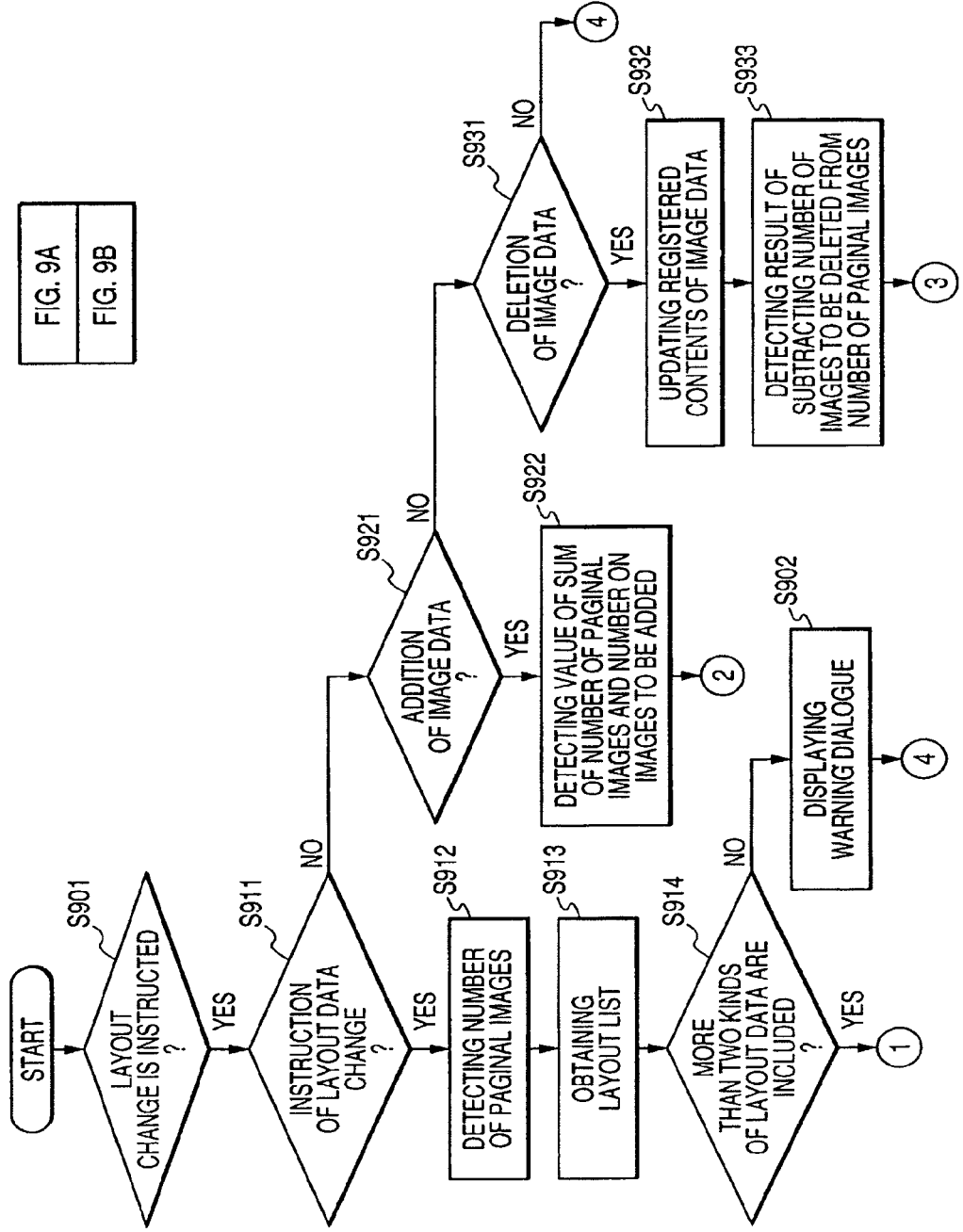

DIGITAL DOCUMENT EDITING METHOD, DIGITAL DOCUMENT EDITING PROGRAM AND DIGITAL DOCUMENT EDITING APPARATUS

This is a continuation of U.S. patent application Ser. No. 11/216,130, filed Sep. 1, 2005, now allowed.

BACKGROUND OF THE INVENTION

1. Field of the Invention

The present invention relates to an editing of a digital document such as a digital album, a digital presentation or a digital document constituted of plural pages and containing an image, a text or a pattern in each page.

2. Related Background Art

An editing operation of a digital album has been executed, on a personal computer, by executing a program installed therein and by positioning an image, a character train and a pattern on a virtual page of a digital album.

In a prior digital album editing, in case, after an image positioning in a virtual page, a new image is added to such virtual page beyond an image amount predetermined for such virtual page, such excessive image is deleted from such virtual page and is positioned in an existing next virtual page. In such case, the image positioning in such existing next virtual page and in existing pages is changed irrespective of the intention of the user. Therefore the user is required to execute again the image positioning in thus changed pages.

Otherwise, in such case in the prior digital album editing, the excessive image is positioned not in an existing page but in a new virtual page, which is created next to the virtual page to which the image was first added. In such case, it is not possible to fix or restrict the total page number of the digital album.

Also in the prior digital album editing, the digital album editing program no longer manages an image once an image deleted from a virtual page of the digital album. Therefore the user, in case of wishing to use such deleted image again, is required to search a desired image from a hard disk of the personal computer, and suffers from insufficient operability.

Also in the prior digital album editing, all the images designated by the user are positioned on the virtual page. Therefore, in case the user designates a large number of images containing similar images, the virtual page of the digital album may result in a drawback of showing repeatedly similar images on the virtual page. The user is required to execute a very cumbersome operation of finding similar images among the images on the virtual page by visual observation and deleting unnecessary images.

SUMMARY OF THE INVENTION

An object of the present invention is, in an editing operation of a digital document constituted of plural virtual pages as represented by a digital album, to transmit, to the user in an easily understandable manner, an image that is not positioned in the virtual page.

In an aspect of the present invention, the aforementioned object can be attained by a digital document editing method comprising an editing area display step of displaying image data to be positioned in a page of a digital document, in an editing area; an image selecting step of selecting one or more image data from the image data displayed in the editing area; a deletion instructing step of instructing a deletion of selected image data from the page; and a display control step of executing a display control, in response to the deletion instruction, to display the selected image data in an evacuation area and not to display in the editing area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

Figure 1:
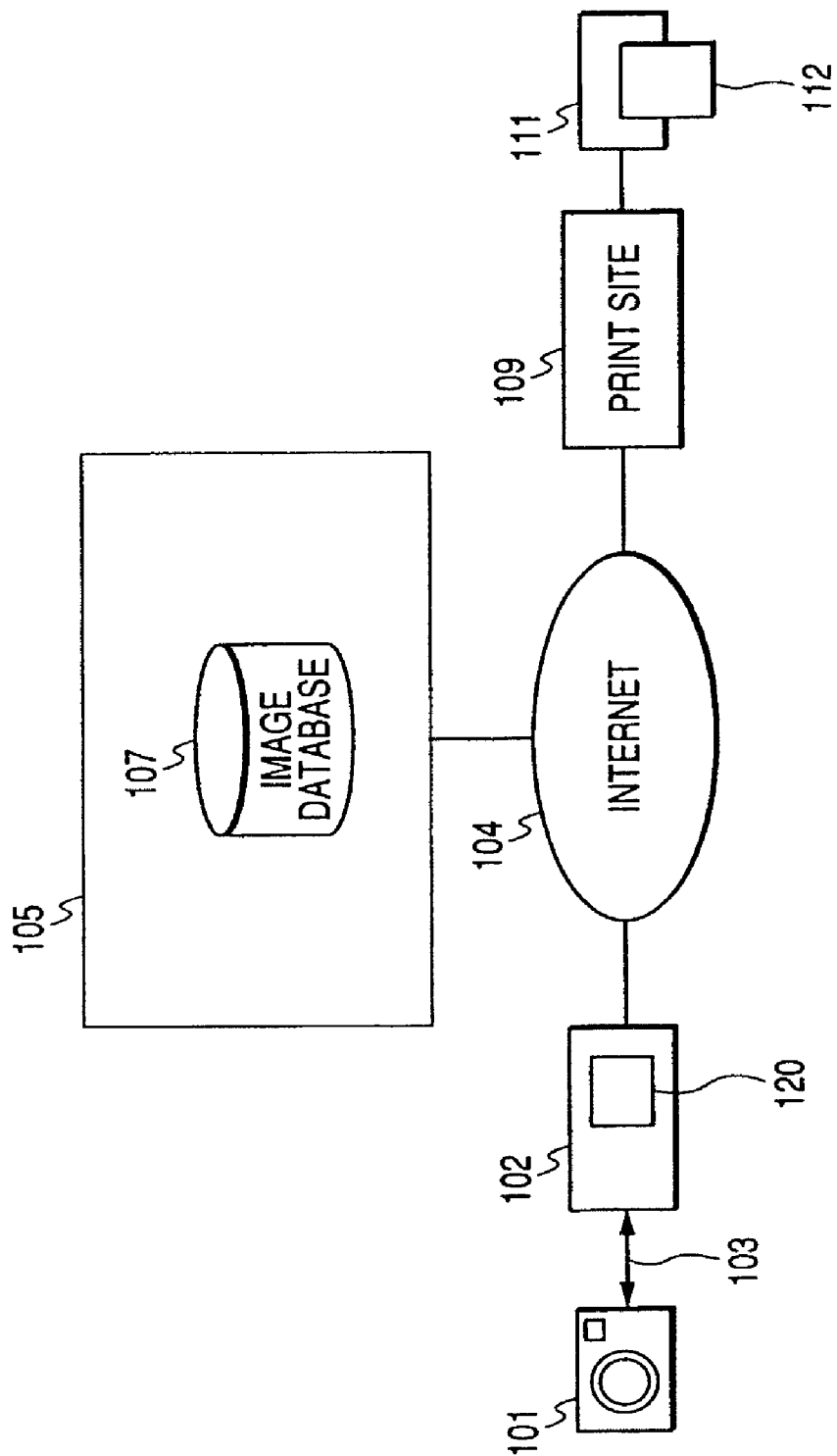
FIG. 1 is a block diagram schematically showing a digital album editing system of the present invention.

FIG. 1 is a view showing a configuration of an information providing system of the present embodiment.

Referring to FIG. 1, 101 denotes an image input apparatus serving to convert an optical image, which is image information, into an electrical signal and, after a predetermined image processing, record and reproduce such signal as digital information. The image input apparatus 101 is constituted for example of a digital still camera, a digital video camera or a scanner. 102 denotes a personal computer to be operated by the user. 103 denotes a data transfer interface for transferring image data, acquired in the image input apparatus 101, to the user PC 102. The data transfer interface 103 is constituted of a wired interface represented by USB (universal serial bus) or IEEE1394, or a wireless interface represented by IrDA or Bluetooth. The image data transferred from the image input apparatus 101 through the data transfer interface 103 to the user PC 102 are stored in a hard disk (HDD) of the user PC 102. The image data transfer from the image input apparatus 101 to the user PC 102 includes a case where the image input apparatus 101 collectively transfer the image data stored in a memory apparatus, according to a command from an operating system (OS) installed in the user PC 102 or an exclusive software, and a case where an OS or an exclusive software of the user PC 102 secures, according to a transfer command transmitted from the image input apparatus 101 to the user PC 102, a data recording area in the HDD of the user PC 102 and receives the image data from the image input apparatus 101.

The user PC 102 is capable of operating a browser having a standard protocol capable of information transfer by an internet 104. The user PC 102, by operating the browser 120, is capable of accessing to a photosite 105 by a protocol such as Hyper Text Transfer Protocol (HTTP), obtaining and analyzing Web page information prepared with a description language such as Hyper Text Markup Language (HTML) or extensible Markup Language (XML), and displaying a Web page on a display of the user PC 102. Such Web page information is linked with multimedia information such as an image and audio signals which the photosite 105 manages in an image DB 107.

Also the user PC 102, by operating the browser 120, is capable of downloading a template and image data of a digital album, to be used in executing a digital album editing program, from the photosite 105 through the internet 104. The template and image data, to be downloaded, of the digital album are stored in the image DB 107.

The user PC 102 is further provided with a digital album editing program for positioning and editing one or more image data on a digital album containing one or more pages. The image data to be contained in the digital album include those obtained from the image input apparatus 101 and stored in the HDD of the user PC 102 and those downloaded from the photosite 105.

Also the user PC 102 can request a print order of the edited digital album to a print site 109 through the photosite 105. The print site 109 executes a printing operation of the digital album data by a printer 111, thereby outputting an album 112. FIG. 1 illustrates only one print site 109, but it may be present in plural units.

Figure 2:
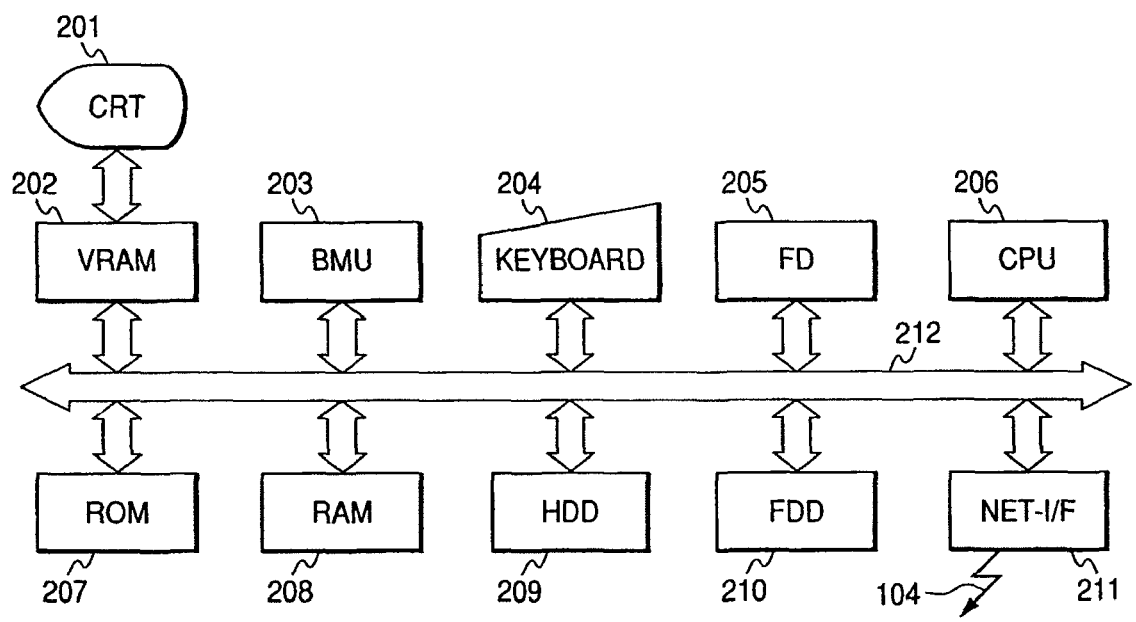
FIG. 2 is a block diagram showing a configuration of a PC of the present invention.

FIG. 2 is a schematic view showing a configuration of an information processing apparatus corresponding to the user PC 102 in the present embodiment.

In FIG. 2, a CRT (cathode ray tube) display 201 displays, on a display frame thereof, editing information such as a document, a pattern or an image, under editing, and user interface information such as an icon, a message or a menu. A VRAM 202 generates an image to be displayed on the display frame of the CRT display 201. The image data generated in the VRAM 202 are transferred according to a predetermined rule to the CRT display 201, which thus displays an image thereon. A bit move unit (BMU) 203 controls a data transfer between memories (for example between VRAM 202 and another memory), or a data transfer between a memory and an I/O device (for example a network interface 211). A keyboard 204 includes various keys for inputting a document and the like. A pointing device 205 is used for designating an icon, a menu or another object displayed on the display frame of the CRT display 201. A central processing unit (CPU) 206 controls various devices connected thereto, according to a control program stored in a read-only memory (ROM) 207, a hard disk (HDD) 209 or a compact disk (CD). A ROM 207 stores various control programs and data. A random access memory (RAM) 208 has a work area for the CPU 206, an evacuation area for data in an error process, and a load area for the control programs. An HDD 209 can store various control programs and contents to be used in the user PC 102. For example, the HDD 209 stores a browser 120, digital album data, and a digital album editing program. A compact disk drive (CD) 210 controls an access to a compact disk. A network interface 211 executes a communication with another information processing apparatus, a printer and the like through the internet 104. A CPU bus 212 includes an address bus, a data bus and a control bus. A control program to the CPU 206 may be provided from the ROM 206, HDD 209 or CD 210, or from another information processing apparatus through the network interface 211 and the internet 104.

Figure 3:
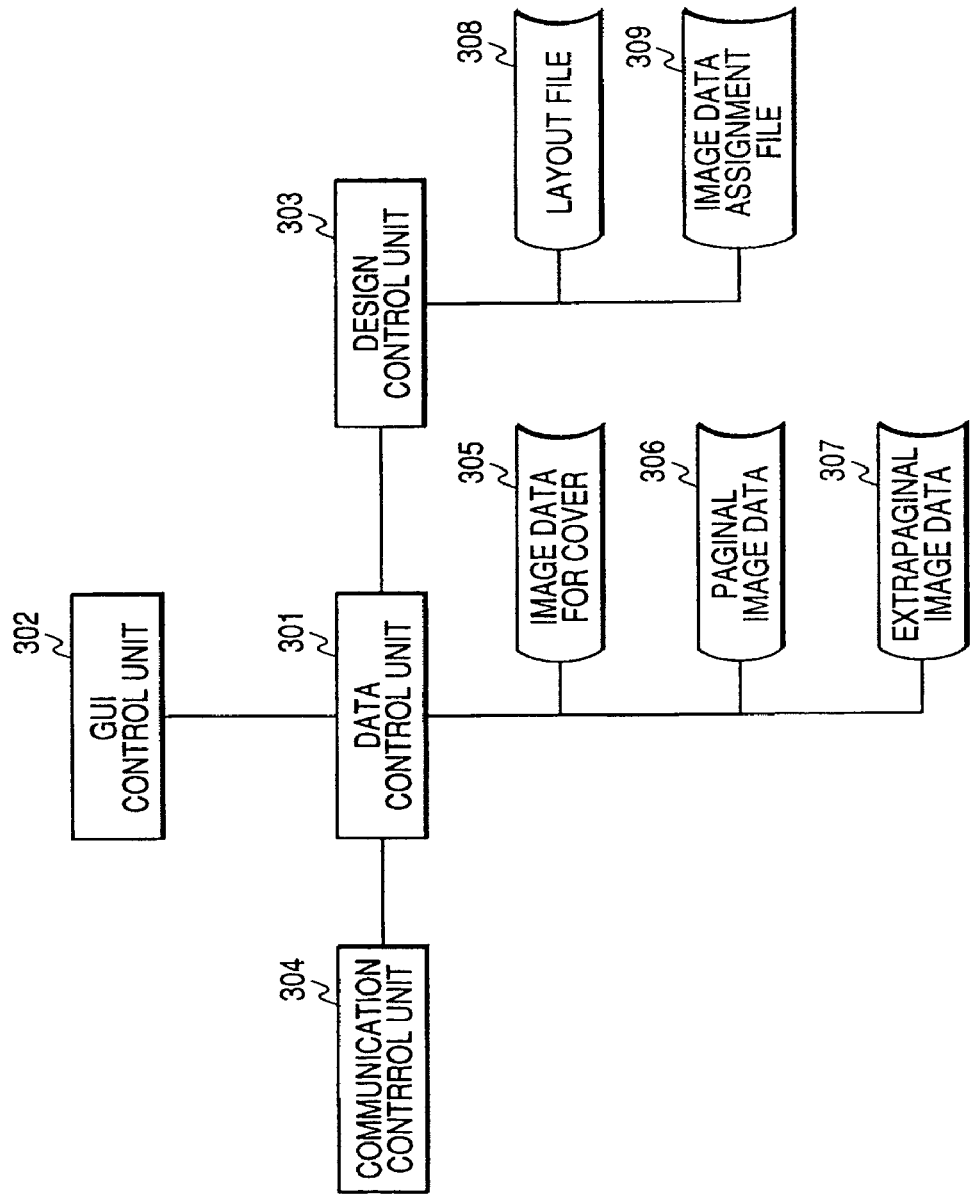
FIG. 3 is a view showing a functional configuration of a digital album editing program of the present invention.

FIG. 3 is a block diagram showing a functional configuration of a digital album editing program of the present embodiment. There are provided a data control unit 301 for managing digital album data and an entire digital album editing program; a GUI control unit 302 for controlling a graphical user interface (GUI) of the digital album editing program, thereby providing the user with operating means and display means for the edited contents; a design control unit 303 for managing design information such as a template file, a layout file 308, and an image data assignment table 309 to be used for the editing of the digital album data; and a communication control unit 304 for preparing print data, required for a print order, based on the edited digital album data and executing a communication process for the print data and information necessary for the print order.

The digital album data managed by the data control unit 301 include cover image data 305 assigned to a cover of a digital album, paginal image data 306 assigned to each page of the digital album, and extrapaginal data 307 not assigned to a page of the digital album. The extrapaginal data 307 are so controlled as to be displayed on an evacuation image display area in a digital album editing frame to be explained later. The layout file 308 records information for determining a position of image data in opened pages of the digital album and of a character train associated with the image data. The image data assignment table 309 records, as a table, information on an amount of images, managed by the design control unit 303 and assigned to each opened page of the digital album. In the present embodiment, a digital album is constituted of a cover page and main pages, which are distinguished and processed separately, but the present invention is also applicable to a case where the cover page and the main pages are not distinguished but processed similarly.

Figure 4:
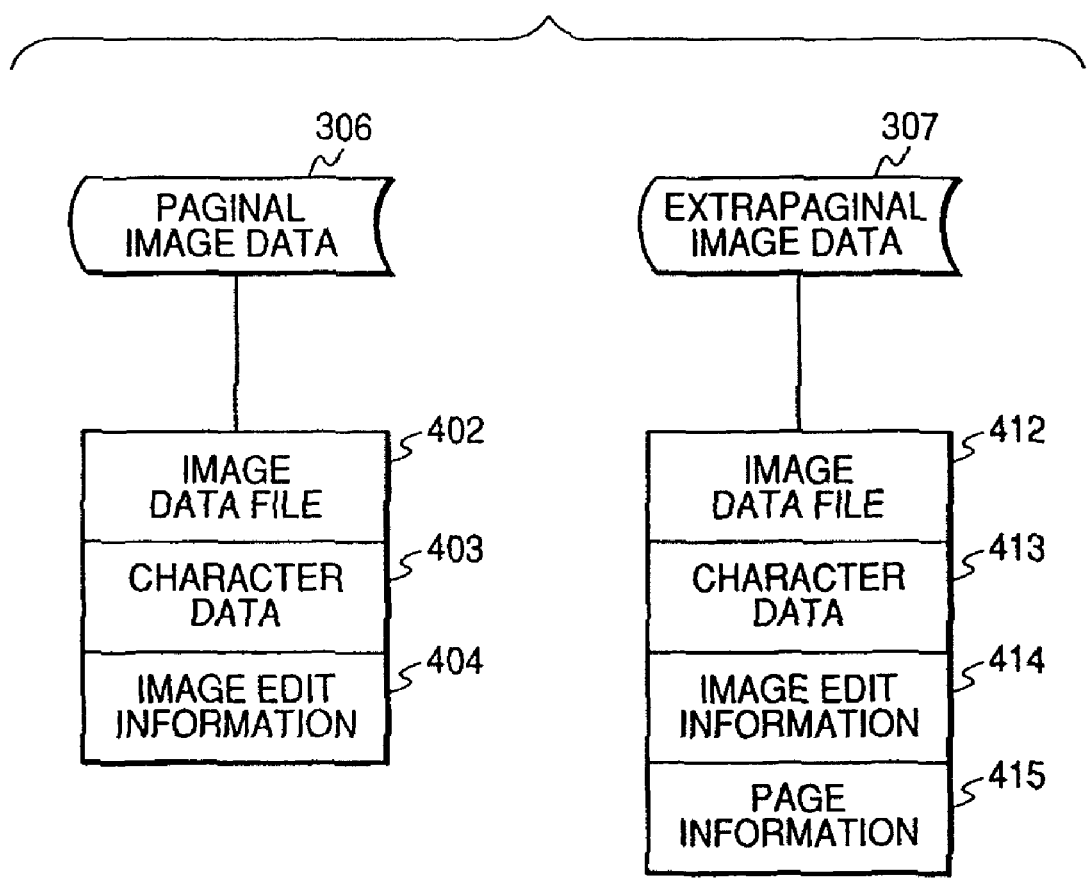
FIG. 4 is a view showing a configuration of image data of the present invention.

FIG. 4 shows a data configuration of the paginal image data 306 and the extrapaginal image data 307. Image data file 402 or 412 for the paginal image data 306 or the extrapaginal image data 307 may be file data, or a path indicating a storage position of file data. Character data 403, 413 contain character data associated with the image data. Image editing information 404, 414 contains an editing content applied to the image data. The editing content can be, for example, a clipping, a regulation of a color or a contrast, or a rotational operation. Page information 415 contains information on a page, in which the image data have been moved from an editing area of such page to the evacuation image display area. A value stored in the page information 415 is displayed together with the image data, on the evacuation image display area.

Figure 5:
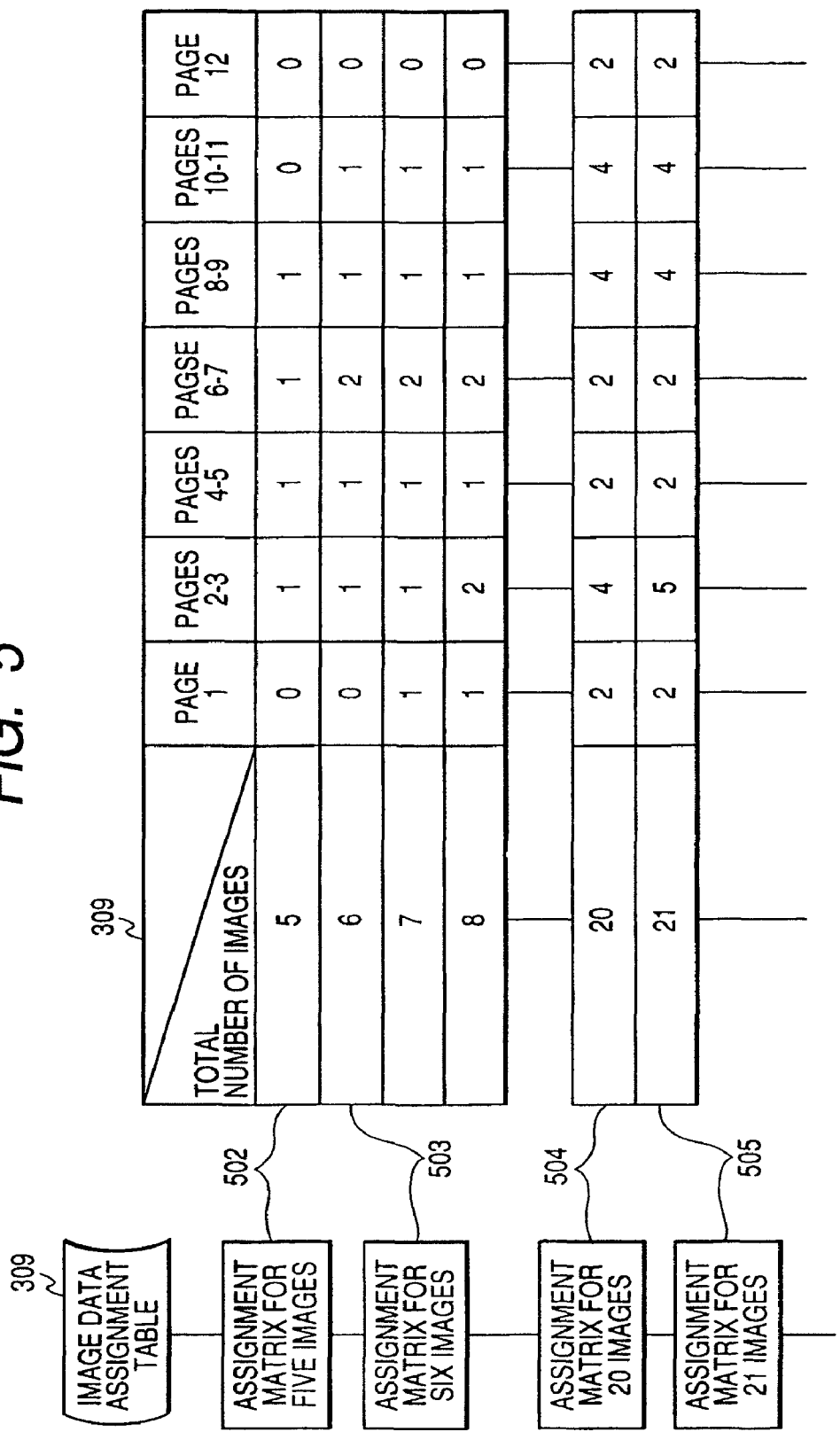
FIG. 5 is a view showing a configuration of an image data assignment table of the present invention.

FIG. 5 is a view showing an example of an image data assignment table 309 in the present embodiment. A number of images assigned to each main page of the digital album is determined, utilizing the image data assignment table 309, based on a total number of main pages of the digital album, and a number of images selected to be included in the digital album. The image data assignment table 309 is present for every total number of the main pages of the digital album. In the following, for the purpose of easier understanding, there will be explained an image data assignment table 309 for 12 main pages in total, with reference to FIG. 5. According to the image data assignment table 309 shown in FIG. 5, for 8 images selected to be included in the digital album, 1 image is assigned in page 1, 2 images in pages 2 and 3, L image in pages 4 and 5, 2 images in pages 6 and 7, 1 image in pages 8 and 9, and 1 image in pages 10 and 11, and no image data are assigned to a page 12.

The image data selected to be included in the digital album are assigned according to an order arbitrarily selected by the user, an order of selection of the image data, an order of photographing dates of the image data, or an order of names of the image data.

In the present embodiment, there is explained a case of positioning the images, selected to be included in the digital album, on both pages in an opened state, but the present invention is likewise applicable also to a case where the images are positioned on each page at a side.

Figure 6:
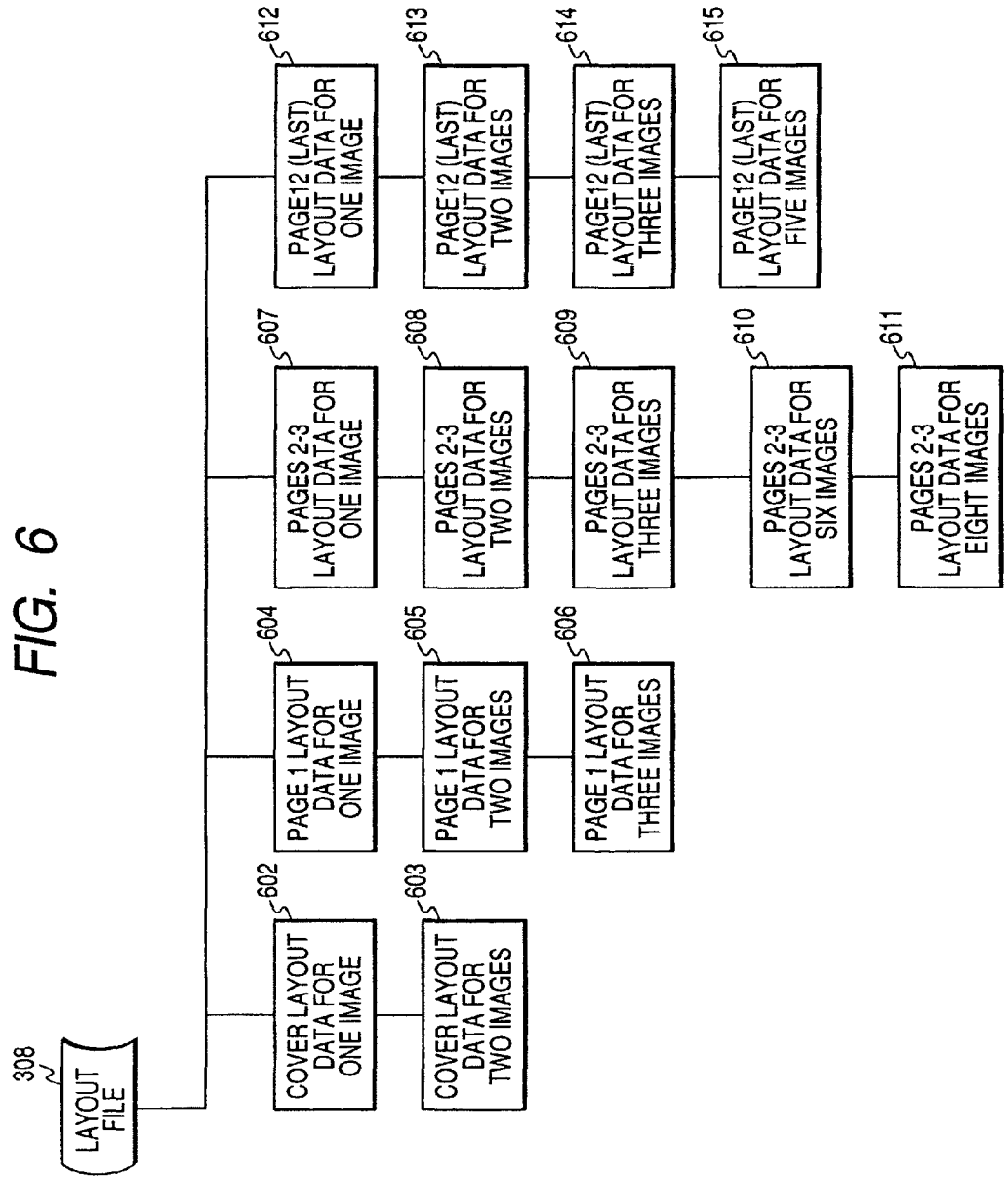
FIG. 6 is a view showing a configuration of a layout file of the present invention.

FIG. 6 is a view showing a configuration of a layout file 308 of the present embodiment. The layout file is present for every total number of the main pages of the digital album. In the following, for the purpose of easier understanding, there will be explained a layout file for 12 main pages in total, with reference to FIG. 6.

The layout file 308 shown in FIG. 6 is for 12 main pages in total. A layout list for a cover page, a layout list for page 1 and a layout list for last page 12 are constructed to position images on a page at one side. Remaining layout lists for pages 2 and 3, pages 4 and 5, ... pages 10 and 11 are constructed for two pages in an opened state. The layout list for the cover page has layout lists respectively corresponding to 1 image and 2 images. Also the layout list for the main page 1 has layout lists respectively corresponding to 1, 2 and 3 images. Also the layout list for the last page 12 has layout lists respectively corresponding to 1, 2, 3 and 5 images. Similarly, each layout list for pages 2 and 3, pages 4 and 5, pages 6 and 7, ... or pages 10 and 11 has layout lists corresponding to optimum number of images.

Figure 7:
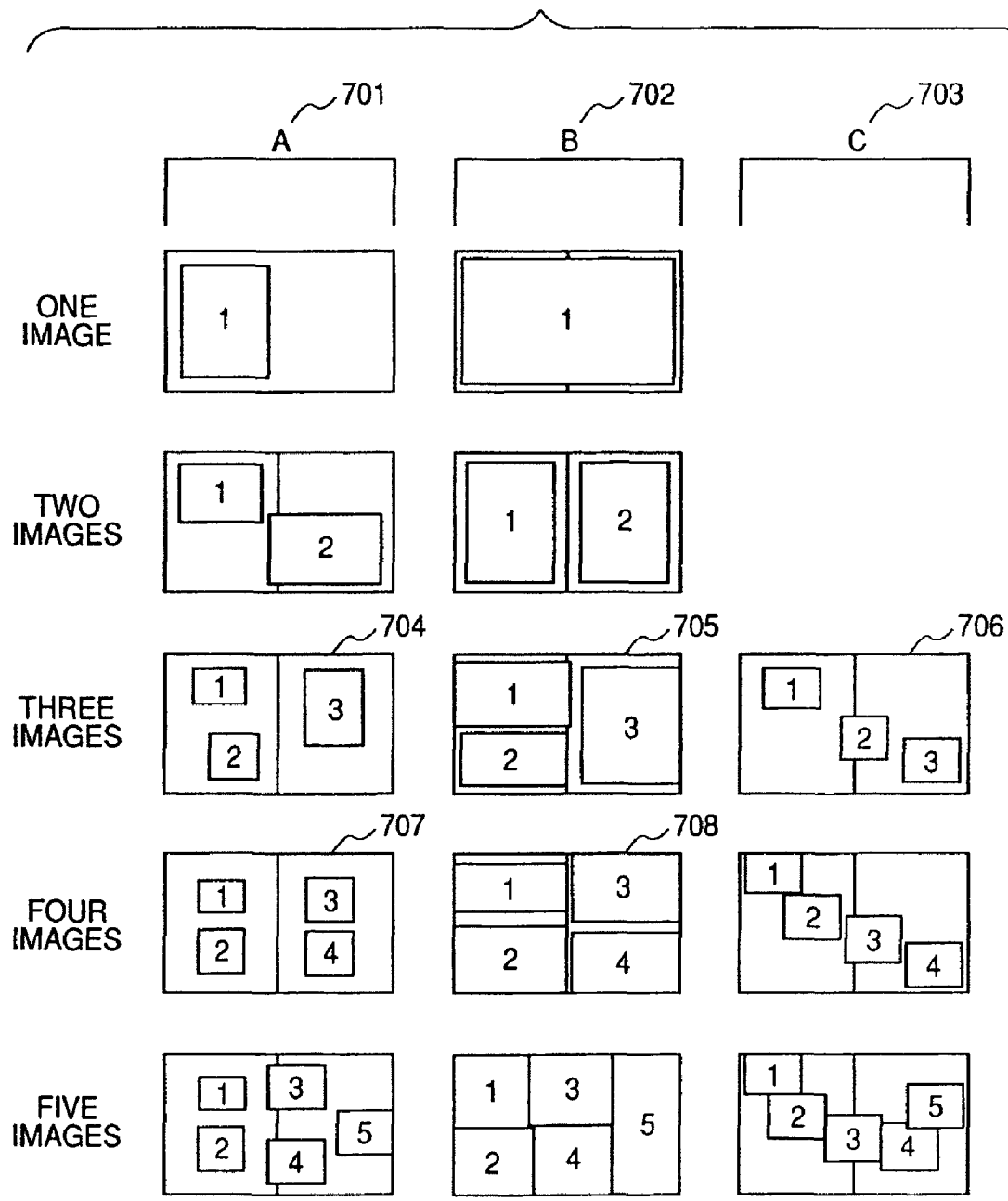
FIG. 7 is a view showing layout data in a layout list of the present invention.

Also each of layout lists 602-615 has one or more layout data for each number of images. FIG. 7 shows an example of the layout data held by the layout list. FIG. 7 indicates that there are, for a certain page, provided layout lists corresponding to 1-5 images and each layout list includes 2 or 3 layout data. The layout lists are classified into layout data A 701, layout data B 702 and layout data C 703. In the present embodiment, the layout data A are taken as a default value. FIG. 7 shows a case of having 3 layout data, but such number is not restricted.

An image arrangement on each page is determined by a number of images assigned to such page and by layout data of the corresponding layout list. For example, in case 3 images are assigned to pages 2 and 3, 3 images are positioned on the pages 2 and 3, according to positions designated by layout data contained in the 3-image layout list 609 for the pages 2 and 3.

However, the layout file 308 does not have, on each page, layout lists corresponding to all the number of the images. For example, the layout file for the pages 2 and 3 has, as shown in FIG. 6, the layout lists corresponding to 1, 2, 3, 6 or 8 images, but does not have those corresponding to 4 or 7 images.

The user PC 102 executes the digital album editing program, utilizing the image data assignment table 309 and the layout file 308 and determines the assignment of image data on each page and an arrangement of such image data, thereby preparing a digital album.

In the editing operation of a digital album in the present embodiment by execution of the digital album editing program, read from the HDD 209, by the CPU 206 of the user PC 102, there will be explained, with reference to FIG. 8, an operation of erasing an image, provided in any of the pages, from such page and displaying such image on an evacuation area.

A step S801 selects and determines an album size and a total number of main pages. The album size is for example an A4 or B5 size, corresponding to a sheet size of an album 112 outputted by the printer 111 based on the digital album data.

A step S802 selects and determines a template file to be applied to the digital album.

A step S803 causes the design control unit 303 to fetch a layout file 308, correlated with the template file determined in the step S802, and the image data assignment file 309.

A step S804 selects image data to be included in the digital album. A selectable range of the number of the images is set according to the total number of main pages determined in the step S301 and the image data assignment table 309 fetched in the step S303. Also there is selected cover image data 305 to be positioned in the cover page of the digital album. Then the data control unit 301 stores a copy of the selected image data in a memory area designated by the digital album editing program.

A step S805 positions, on the cover page of the digital album, the cover image data 305 selected in the step S804. At first the layout file 308 is read based on the total number of the main pages determined in the step S801. Then, according to the number of cover image data 305 selected in the step S804, a cover layout list 602 or 603 is determined. According to default layout data contained in thus determined cover layout list 602 or 603, the cover image data 305 are positioned on the cover page. The cover includes a front cover and a rear cover.

Figure 11:
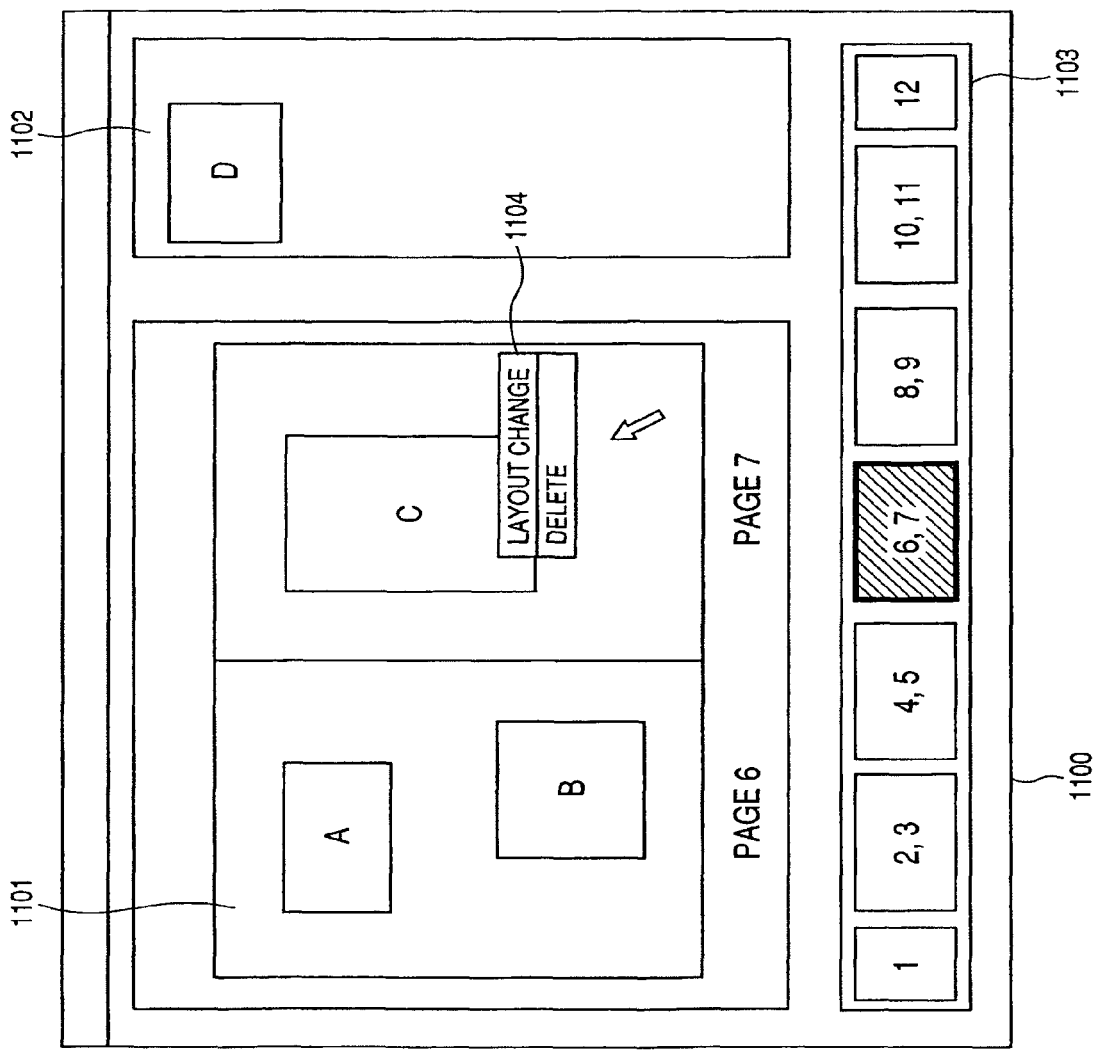
FIG. 11 is a view showing a digital album editing frame of the present invention.

A step S806 positions, on each main page in the digital album, paginal image data 306 selected in the step S804. At first the image data assignment table 309 is read, based on the total number of main page determined in the step S801 and the total number of the paginal image data 306 selected in the step S804. Then, according to thus read image data assignment table 309, the image data are assigned to each main page of the digital album. Then the layout file 308 is read based on the total number of main pages determined in the step S801. Then a layout list is determined for each page, according to the number of the paginal image data 306 assigned to each page. Then, according to default layout data of the layout list for each page, the paginal image data 306 are positioned on each main page of the digital album. The positioning process for the paginal image data 306 is executed for all the main pages. The paginal image data 306 are not positioned in a page on which the paginal image data 306 are not assigned according to the image data assignment table 309. Then a digital album editing frame 1101 to be explained later, is displayed, as shown in FIG. 11, on the CRT 201 of the user PC 102.

A step S807 executes an editing of characters to be recorded in the digital album, such as an input process of a character train representing a comment on the image data, and a selection of a font, a font color and a font size of the inputted character train.

A step S808 executes a layout changing process such as an image exchange in each page of the digital album, an image addition to a page, an image deletion from a page, a change in the arrangement within a page. Such layout changing process will be explained later in more details with reference to FIG. 9.

Then a step S809 executes a process of confirming whether thus prepared digital album data satisfy a form and conditions for a print order. More specifically, there is confirmed whether the cover page, contained in the digital album data, and the paginal image data, displayed in the main page editing area, have an enough resolution for printing.

A step S810 prepares print data necessary for an album print order, based on the digital album data. The print data are used for instructing a printing of the paginal image data, positioned on each page of the digital album, in a same arrangement also on a physical album.

A step S811 transmits the print data prepared in the step S810 and order information necessary for a print order, to the photosite 105, which transfers such information to the print site 109.

A step S812 confirms whether the digital album data are to be stored.

In case the storage of the digital album data is confirmed in the step S812, a step S813 stores the prepared digital album data in the HDD 209 of the user PC 102.

Figure 10:
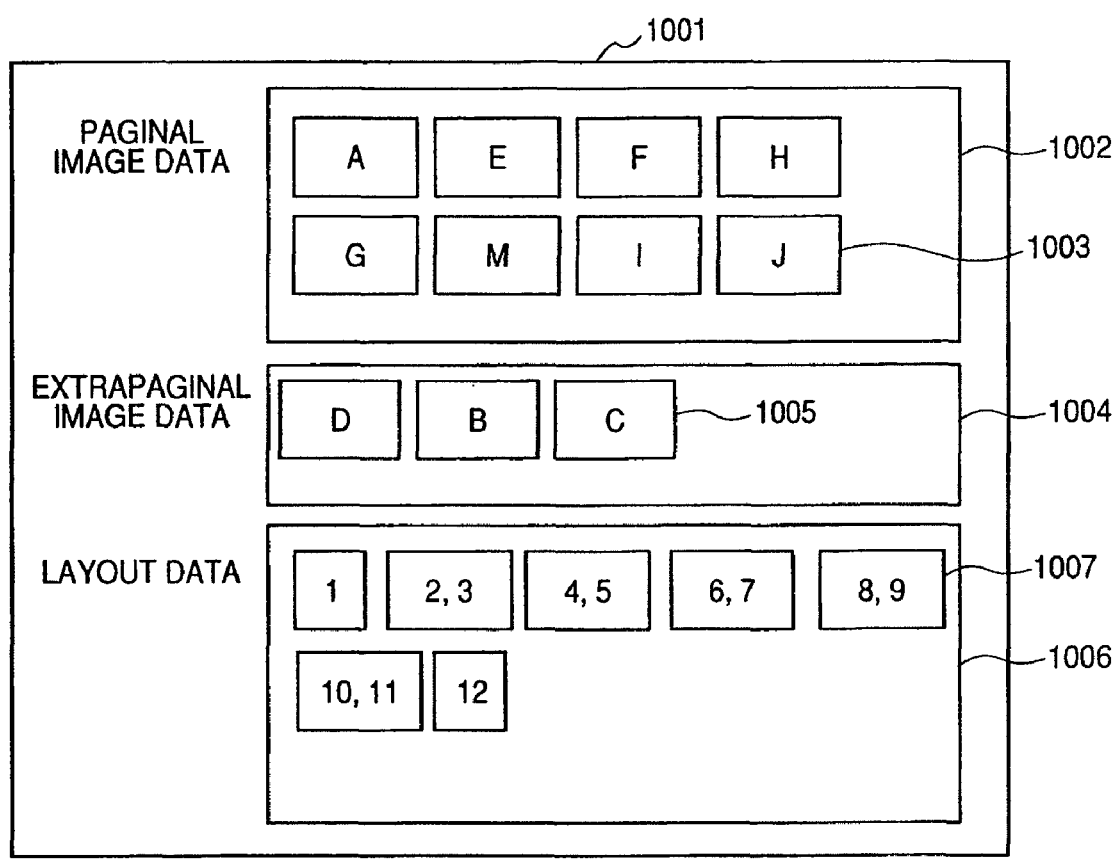
FIG. 10 is a view showing a configuration of digital album data of the present invention.

FIG. 10 is a data structure view showing a data configuration of the digital album data to be stored. There are shown entire digital album data 1001, an area 1002 for storing paginal image data 306, each paginal image data 1003 (306), an area 1004 for storing extrapaginal image data, each extrapaginal image data 1005 (307), an area 1006 for storing layout data used for arrangement in each main page, and such layout data 1007. The layout data 1007 may further include an order of arrangement of the image data in each page, a number of the image data, a position of the image data and a frame position for indicating a character train associated with the image data.

In the present embodiment, as the extrapaginal image data 307 are included in the digital album data, the image data not registered as the paginal image data are displayed also at a re-editing of the digital album, so that the user can easily confirm the image data that were judged as unnecessary in the previous editing.

Figure 8:
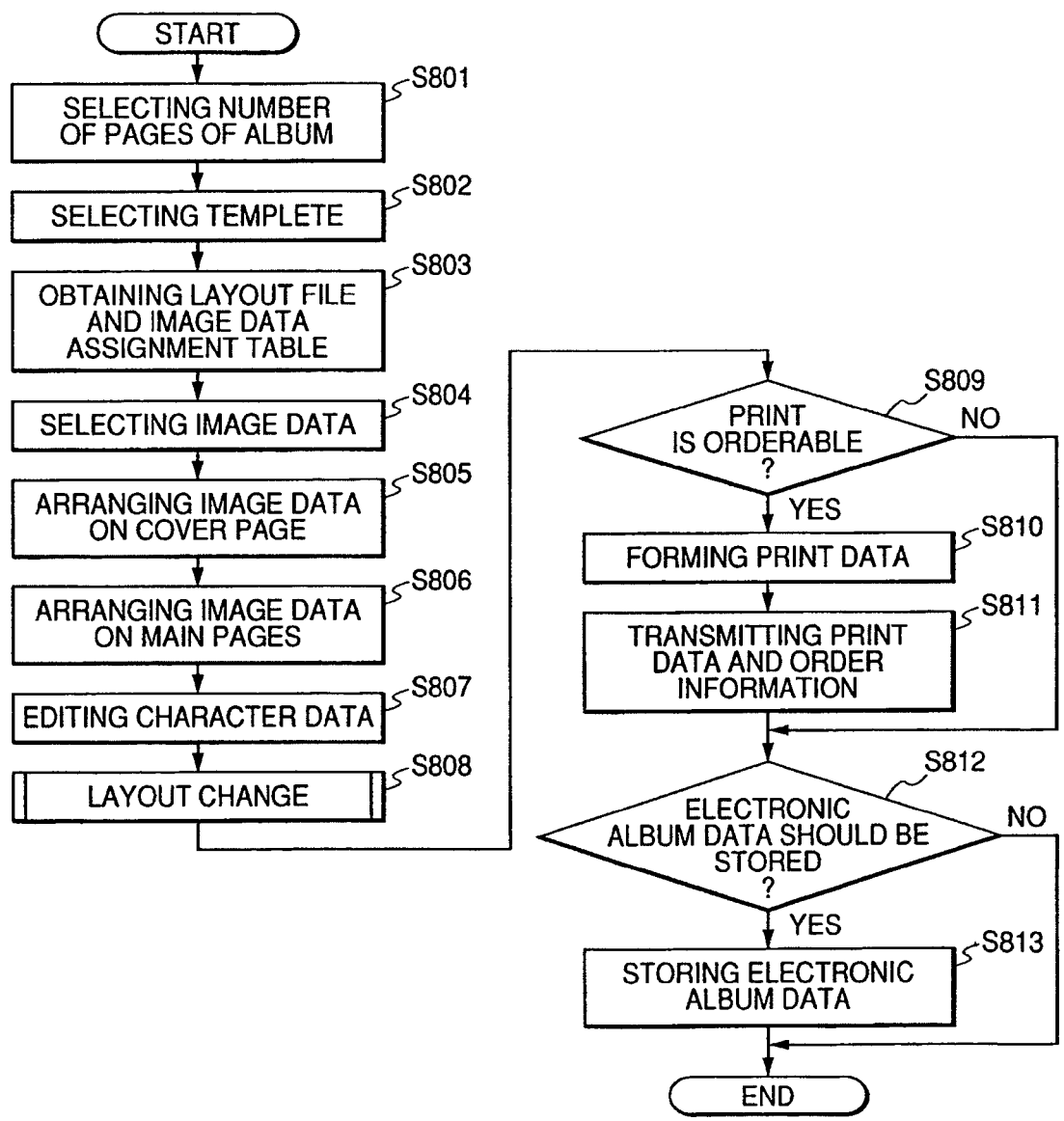
FIG. 8 is a flow chart showing a process of editing a digital album by executing a digital album editing program on a PC of the present invention.
Figure 9B:
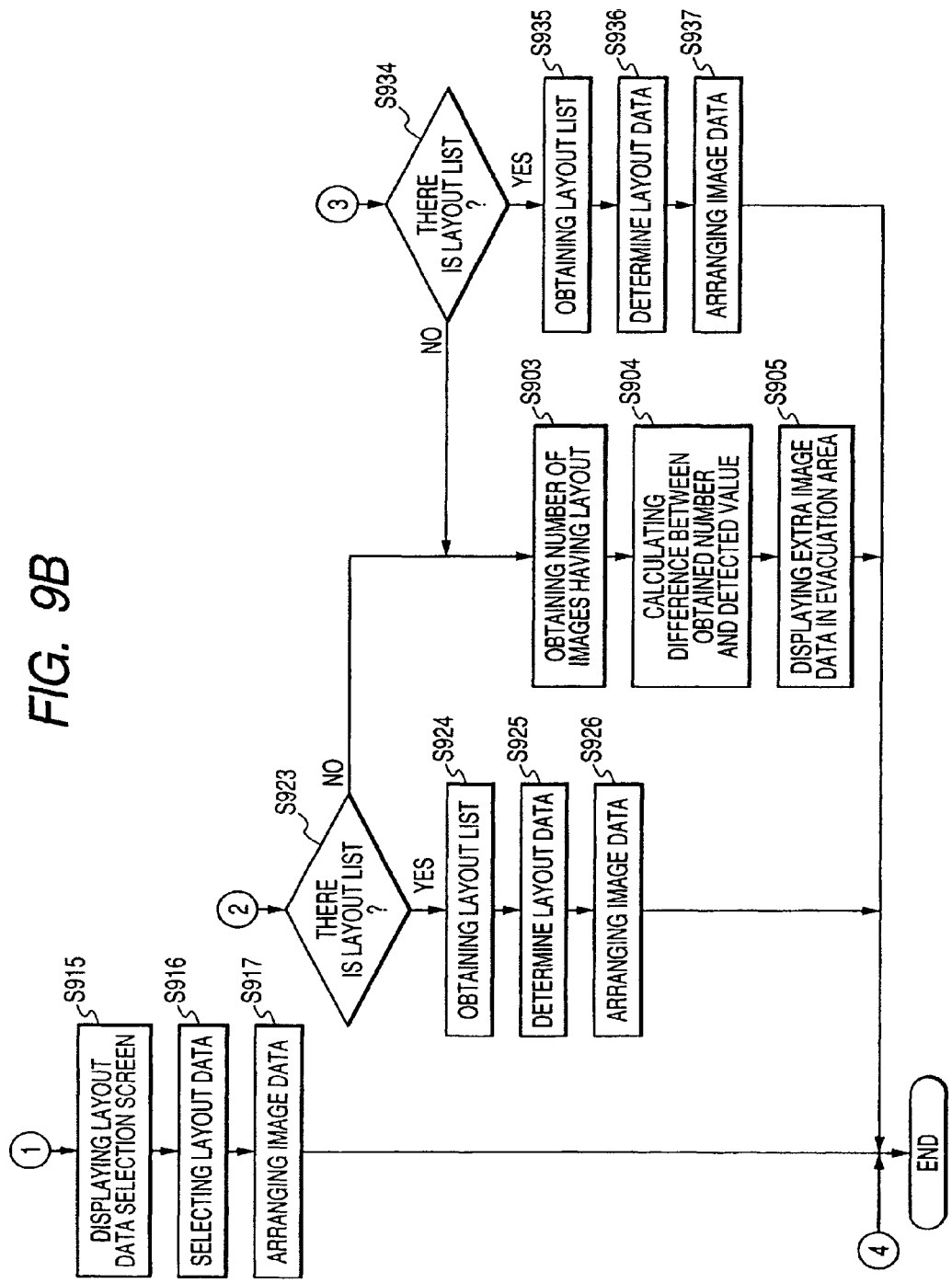
FIG. 9 is comprised of FIGS. 9A and 9B are flow charts showing a process of editing a digital album by executing a digital album editing program on a PC of the present invention.

FIGS. 9A and 9B are flow charts showing a layout changing process to be executed in the step S808 in FIG. 8.

A step S901 discriminates whether a page layout change has been instructed by the user. The page layout change includes, for example, an exchange of the image data positioned on a page of the digital album, an addition or a deletion of image data to or from a page, a transfer of image data from a page to another, and a change in the selection of the page layout data.

In FIG. 11, there are shown a digital album editing frame 1100; a main page editing area 1101 displaying a page under editing; an evacuation image display area 1102 for displaying image data which are selected in the step S804 but are not assigned in a page in a later editing operation; and a page list display area 1103 for displaying all the page numbers contained in the digital album. In the page list display area 1103, a page under editing is indicated by emphasizing the page number of such page.

FIG. 11 shows, as an example, a state where the main page under editing is pages 6 and 7, and, in the main page editing area 1101, images A, B and C are arranged according to 3-image layout data for the pages 6 and 7. Also page numbers of the pages 6 and 7 are displayed in an emphasized state in the page list display area 1103. Also the evacuation image display area 1102 displays an image D that is not assigned to the page as a result of the editing operation.

In FIG. 11, the page list display area 1103 only displays page numbers, but it is also possible display thumbnail image representing an image on each page.

An instruction 1104 is displayed in response to a right click of the pointing device 205 on the main text editing area 1101.

In an initial image of the digital album editing frame 1100 displayed in the step S806, the image D is not present in the evacuation image display area 1102.

A step S911 discriminates whether the page layout change instruction has been a "change of page layout data". More specifically, when the user executes a right clicking operation of the pointing device 205 on the main page editing area 1101, the instruction list 1104 is displayed, and when the user selects, by the pointing device 205, "layout change" from the instruction list 1104, it is identified that "change of page layout data" has been instructed.

In case the step S911 identifies that the instruction of the page layout change is "change of page layout data", a step S912 detects a number of images displayed on the main page editing area 1101.

A step S913 obtains a layout list corresponding to the number of images detected in the step S912.

A step S914 discriminates whether the layout list, obtained in the step S913, contains two or more layout data.

Figure 12:
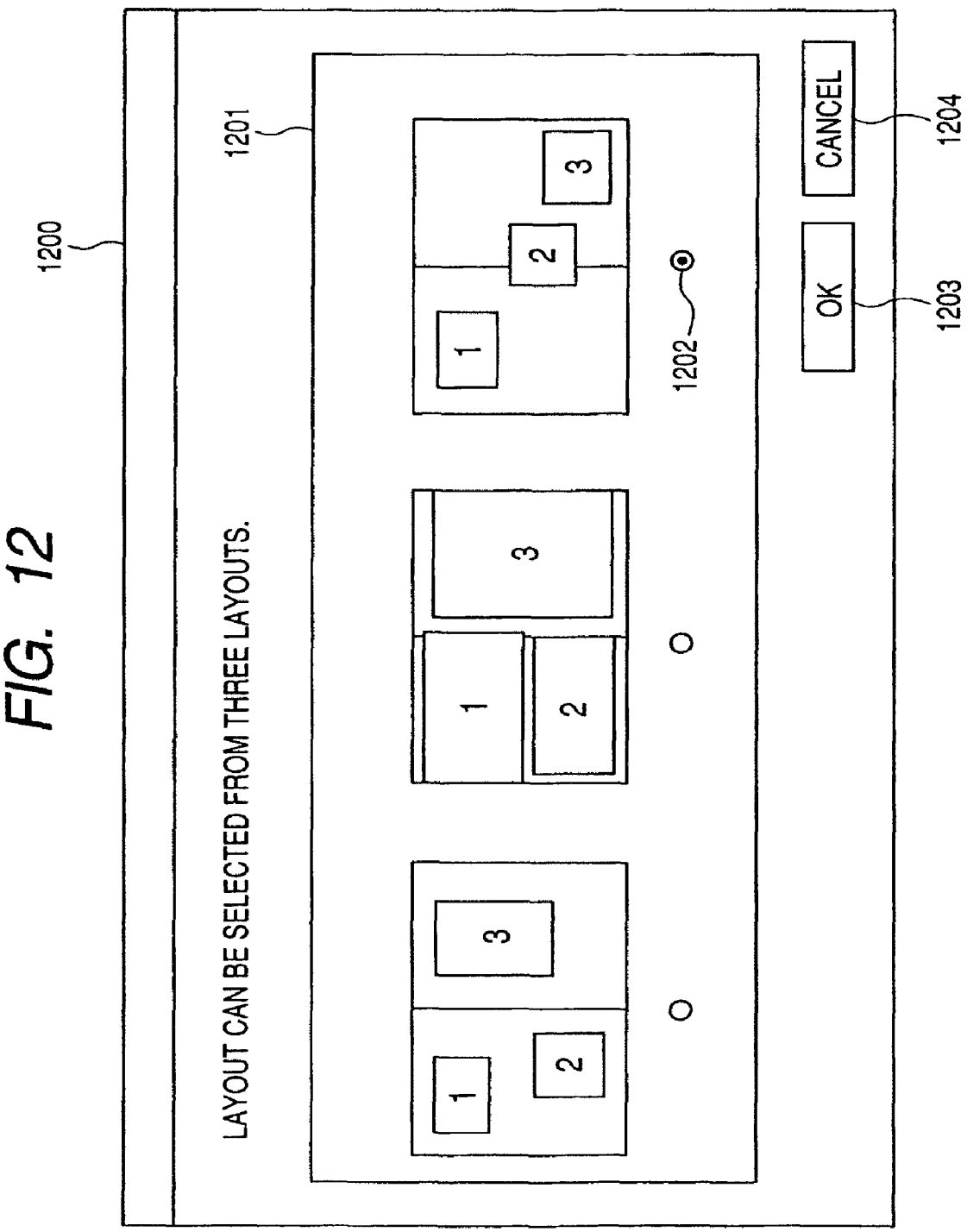
FIG. 12 is a view showing a layout data selecting frame of the present invention.

In case the step S914 identifies that the layout list contains two or more layout data, a step S915 displays the layout data, contained in the layout list, on a layout data selecting frame 1200 as shown in FIG. 12. FIG. 12 shows an example where the main page editing area is detected to contain three images. FIG. 12 shows layout data 1201 of three kinds, contained in the layout list. There are also provided an OK button 1203 and a cancel button 1204, and a depression of the OK button 1203 selects and determines layout data which are turned on in a check box 1201, whereupon the layout data selecting frame is no longer displayed. Also a depression of the cancel button 1204 terminates the change of the page layout data, whereupon the layout data selecting frame is no longer displayed. The displayed layout data 1201 include the layout data utilized for positioning the image data in the main page editing area 1101, and, in case the layout data utilized for the current positioning of the image data are again selected, the sequence may be terminated without executing an ensuing process. Also the layout data utilized for the current image positioning may be excluded from the display of the layout data 1201.

A step S916 selects, among the layout data 1201 in the layout data selecting frame 1200 displayed in the step S915, layout data of which a corresponding check box is turned on.

A step S917 positions the paginal image data 306 displayed in the main page editing area 1101, according to the layout data selected in the step S916.

Figure 16:
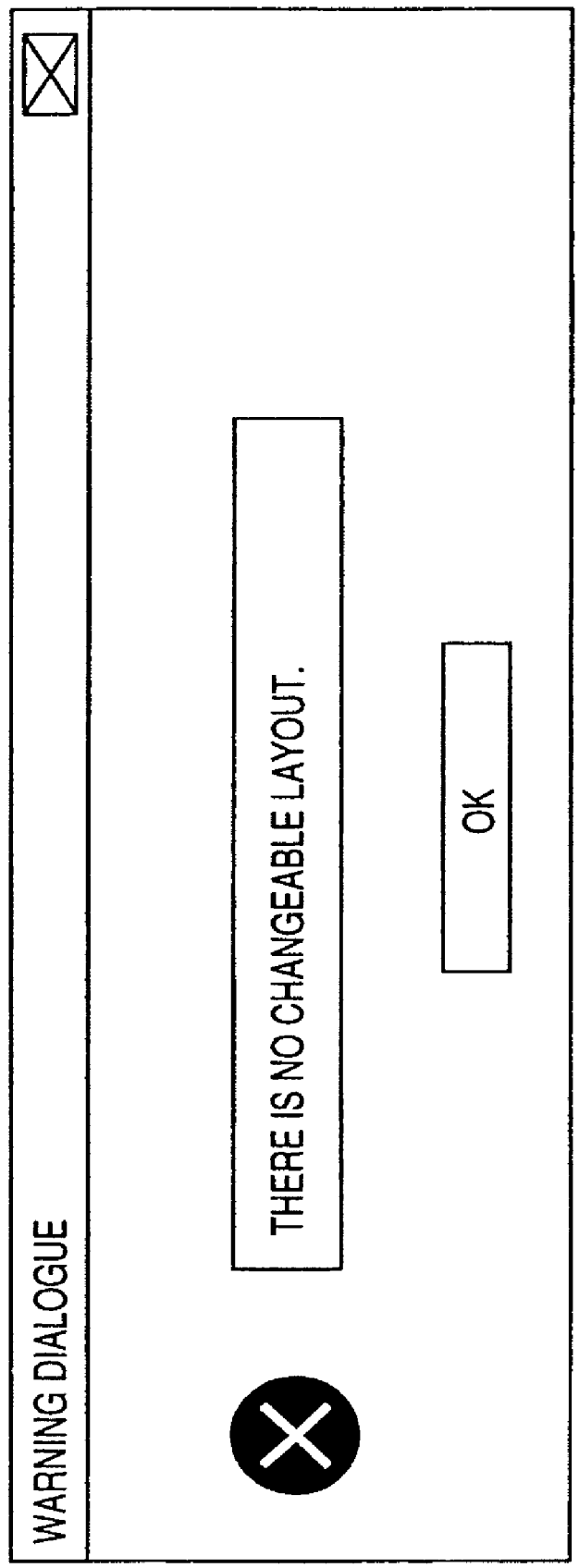
FIG. 16 is a view showing a warning dialog of the present invention.

In case the step S914 identifies that two or more layout data are not present, a step S902 displays a warning dialog. FIG. 16 shows an example of the warning dialog.

Figure 13:
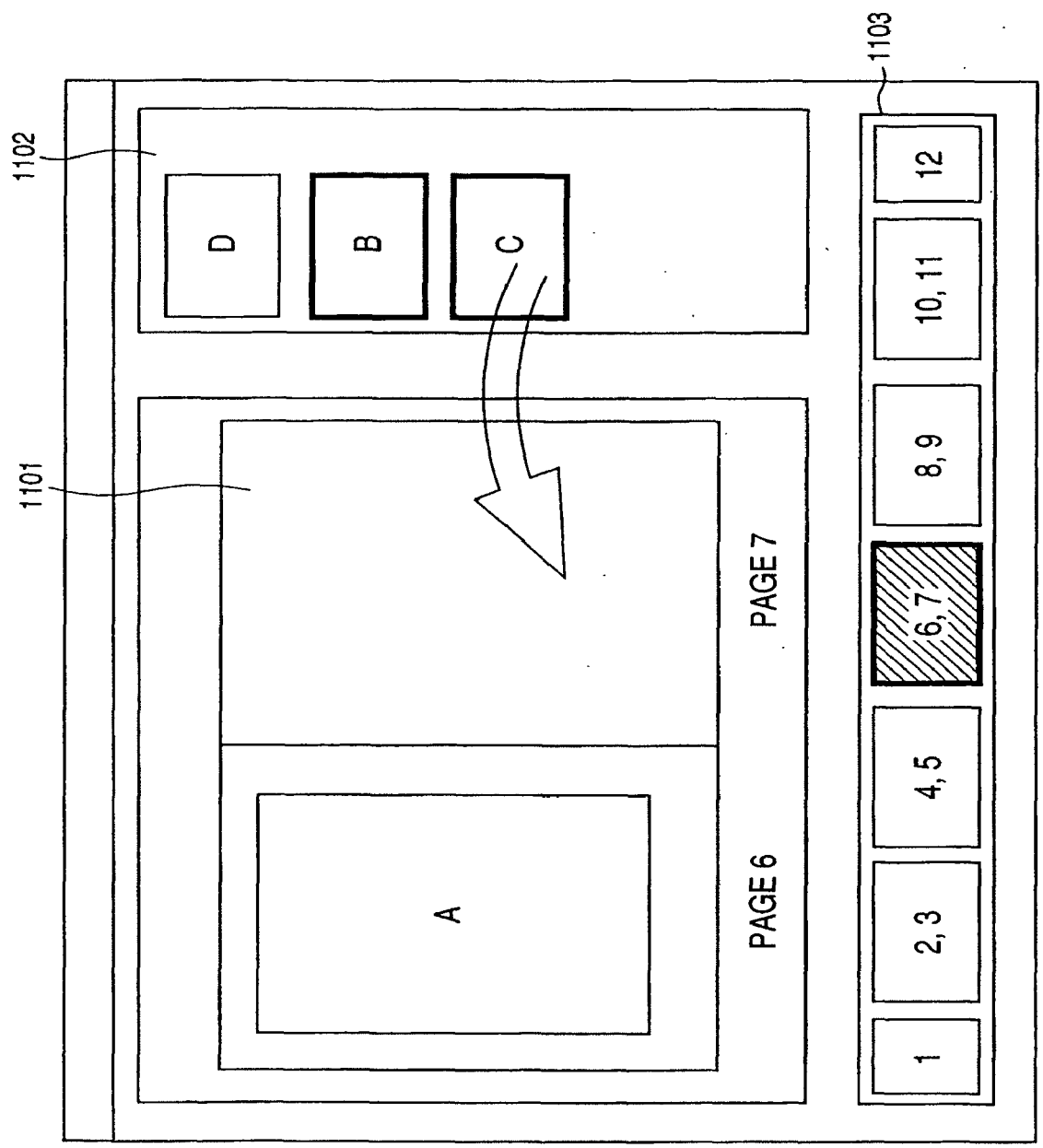
FIG. 13 is a view showing a digital album editing frame of the present invention.

A step S921 discriminates whether the page layout changing instruction is "an image data addition to the page". More specifically, when the user instructs, with the pointing device 205, to move an image displayed in the evacuation image display area 1102 to the main page editing area 1101 as shown in FIG. 13, there is identified an instruction for "an image data addition to the page". FIG. 13 shows a concept of operation that the user selects an image. C from the images B, C and D displayed in the evacuation image display area 1102 and instructs an addition to the main page editing area by a drag-and-drop operation. It is also possible, in the images displayed in the evacuation image display area 1101, to select plural images at the same time.

A step S922 calculates a sum of a number of the images displayed on the main page editing area 1101 and a number of the images instructed in the step S921 for addition.

A step S923 discriminates whether a layout list, corresponding to the summed number detected in the step S922, is present.

In case the step S923 identifies that such layout list is present, a step S924 obtains such layout list.

A step S925 selects and determines default layout data in the layout lists obtained in the step S924.

Figure 14:
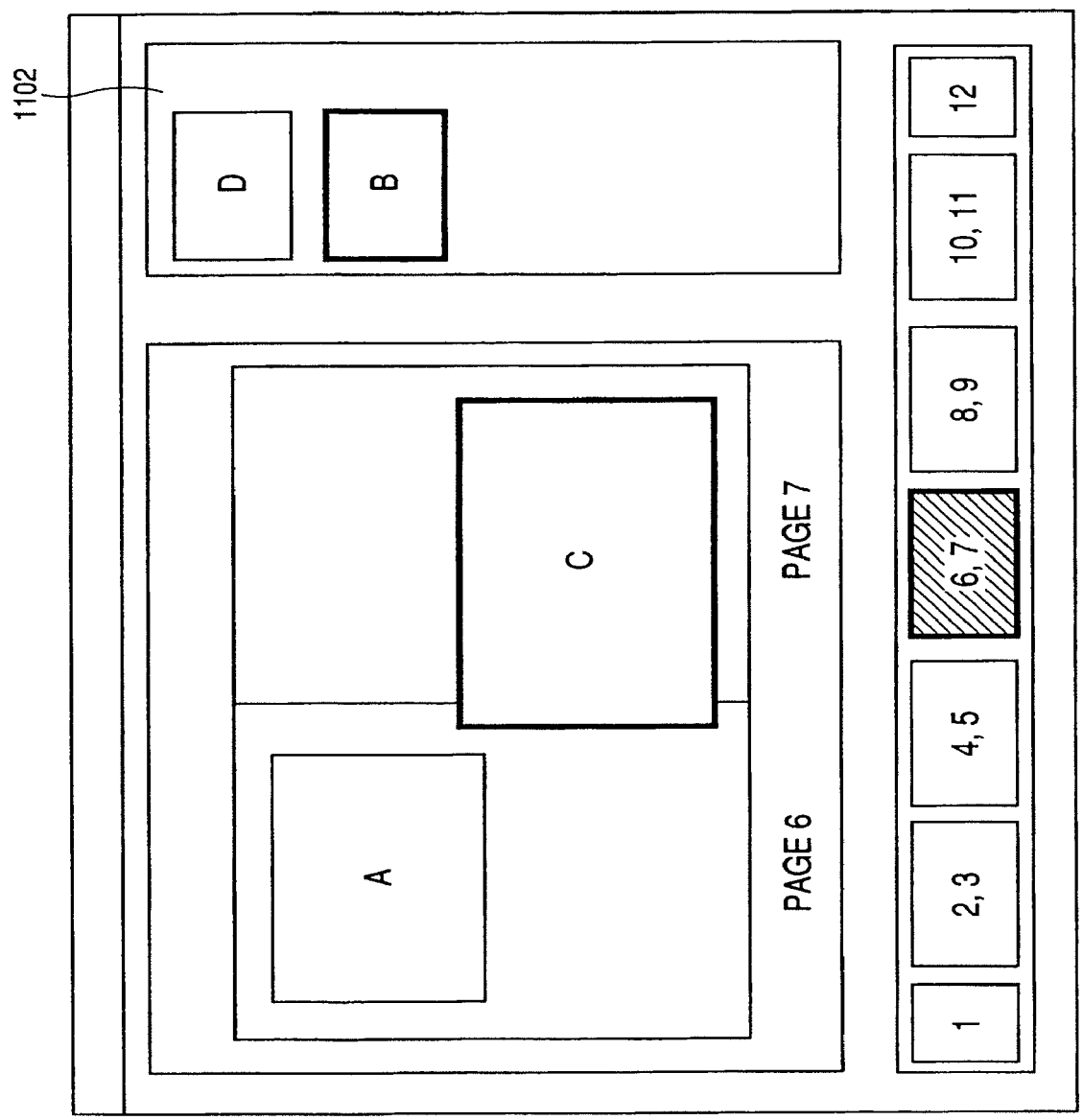
FIG. 14 is a view showing a digital album editing frame of the present invention.

A step S926 positions the image data instructed for addition in the step S921 and the images already displayed in the main page editing area, according to the layout data determined in the step S925. FIG. 14 shows an example of the image frame after such positioning. FIG. 14 shows a case where an image C is added to a state in which an image A is positioned according to 1-image layout data as shown in FIG. 13, whereby two images in total are displayed on the main page editing area 1101 and are arranged therein according to 2-image default layout data for the pages 6 and 7. FIG. 14 also shows that the evacuation image display area 1102 no longer displays the image C. In this state, the data control unit 301 re-registers the image C as paginal image data 306 instead of extrapaginal image data 307.

In the present embodiment, the image data for addition are selected from those displayed in the evacuation image display area 1102, but such selection may also be made from the image data stored in the HDD 209 of the user PC 102, the image data held in an application program other than the digital album editing program, or the image data stored in the image DB 107 of the photosite 105.

A step S931 discriminates whether the page layout changing instruction is "an image data deletion from the page". More specifically, when the user instructs, with the pointing device 205, to move an image displayed in the main page editing area 1101 to the evacuation image display area 1102, there is identified an instruction for "an image data deletion from the page". Otherwise, when the user executes a right clicking operation of the pointing device 205 on the main page editing area 1101, the instruction list 1104 is displayed, and when the user selects, by the pointing device 205, "deletion" from the instruction list 1104, it is identified that "an image data deletion from the page" has been instructed.

A step S932 causes the data control unit 301 to renew a registration of the image data instructed for deletion from the page in the step S931. In case the image of such image data is instructed to be moved to the evacuation image display area 1102, the registration for such image data as paginal image data 306 is renewed as extrapaginal image data 307, and such image data are displayed in the evacuation image display area 1102. On the other hand, in case the deletion of the image data is instructed by selecting "deletion" from the page layout change instruction list 1104, the image data are erased from the memory area on the HDD 209, managed by the data control unit 301.

A step S933 calculates a remainder of a number of the images displayed on the main page editing area 1101 after subtracting therefrom a number of the images instructed in the step S931 for deletion.

A step S934 discriminates whether a layout list, corresponding to the remainder calculated in the step S933, is present.

In case the step S934 identifies that such layout list is present, a step S935 obtains such layout list.

A step S936 selects and determines default layout data in the layout lists obtained in the step S935.

A step S937 positions the image data after excluding the image data instructed for deletion in the step S931 from the images already displayed in the main page editing area, according to the layout data determined in the step S936.

Figure 15:
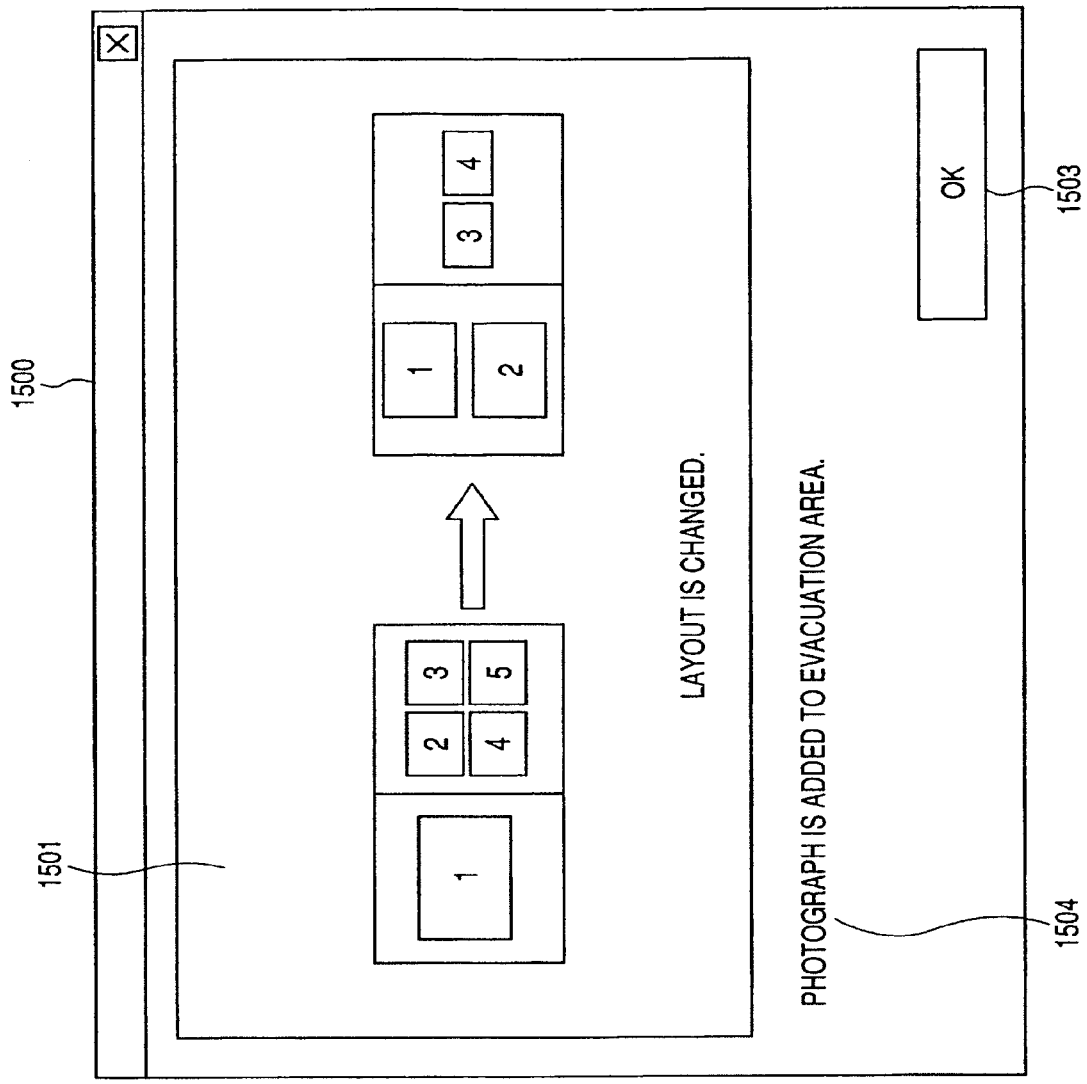
FIG. 15 is a view showing a change notifying dialog of the present invention.

It is also possible, in the step S924 or S935, to notify the user of a change in the image arrangement displayed in the main page editing area 1101, by displaying a change notifying dialog on the CRT display 201 of the user PC 102. An example of such dialog image is shown in FIG. 15. In FIG. 15, the user is notified of image arrangements 1501 before and after the change, and a message 1504 indicating that the image is displayed in the evacuation image display area 1102. In response to a depression of an OK button 1503 by the user with the pointing device 205, the change notifying dialog frame is no longer displayed and the image arrangement is changed according to the newly selected layout data.

Also in case the step S923 or S934 identifies that the corresponding layout list is not present, the sequence proceeds to a step S903 for obtaining a layout list containing a largest number of images less than the detected number in case of the process of the step S923, or a layout list containing a minimum number of images larger than the detected number in case of the process of the step S934.

Then a step S904 calculates a difference between the number of images of the layout list obtained in the step S903 and the number of images detected in the step S922 or S933.

Then the step S905, in case of a process from the step S923, selects a number of images, calculated in the step S904, from the images instructed for movement to the main page editing area 1101, and displays such selected images in the evacuation image display area 1102. The images to be added are displayed in the main page editing area 1101. Also there may be displayed a dialog indicating that the images displayed in the main page editing area 1101 are changed for display in the evacuation image display area 1102.

Also in case of a process from the step S934, the step S905 displays the images, including a margin, in the main page editing area 1101, according to the layout data of the obtained layout list corresponding to the number of images. Also there is displayed a dialog requesting an image addition in the page in order to fill the margin.

Also in the present embodiment, it is also possible, before executing the process of the step S921, S922 or S933, to obtain the numbers of images for which the layout lists are available for the page displayed on the main page editing area 1101, and to display such numbers on the digital album editing frame 1100. In this manner, the user can know in advance changeable number of the images.

According to the present embodiment, as explained in the foregoing, an image deleted from a certain image is displayed in the evacuation area, whereby an image layout in other pages is not influenced.

Also as an image deleted from a certain image is displayed in the evacuation area, in case of including an image that has been erased from the page again into the page, the user can easily select such image.

Second Embodiment

In the present embodiment, there will be explained an operation, in the digital album editing frame 1100 displayed for editing an digital album, of displaying, together with an image, a page number in which the image existed before evacuation, on the evacuation area 1102. In the following, parts same as those in the first embodiment will not be explained and parts featuring the present embodiment only will be explained in detail.

Figure 17:
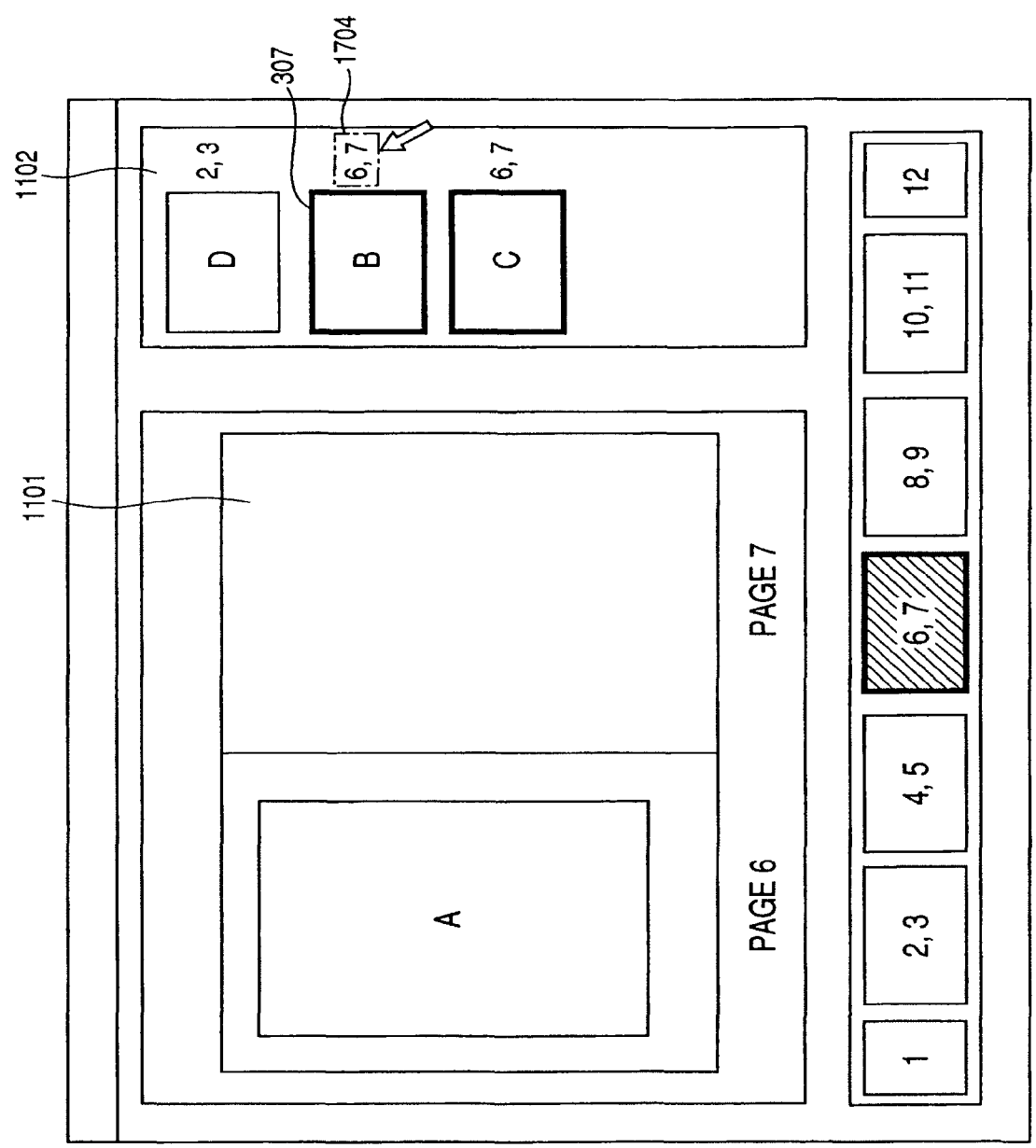
FIG. 17 is a view showing a digital album editing frame of the present invention.

FIG. 17 shows a digital album editing frame 1101 of the present embodiment, displayed for executing an editing operation on the digital album. The digital album editing frame 1101 shown in FIG. 17 displays, in addition to the items shown in FIG. 11, a page number 1704 before evacuation. The page number 1704 before evacuation is a number of a page in which the extrapaginal image data 307 were assigned before.

Figure 18:
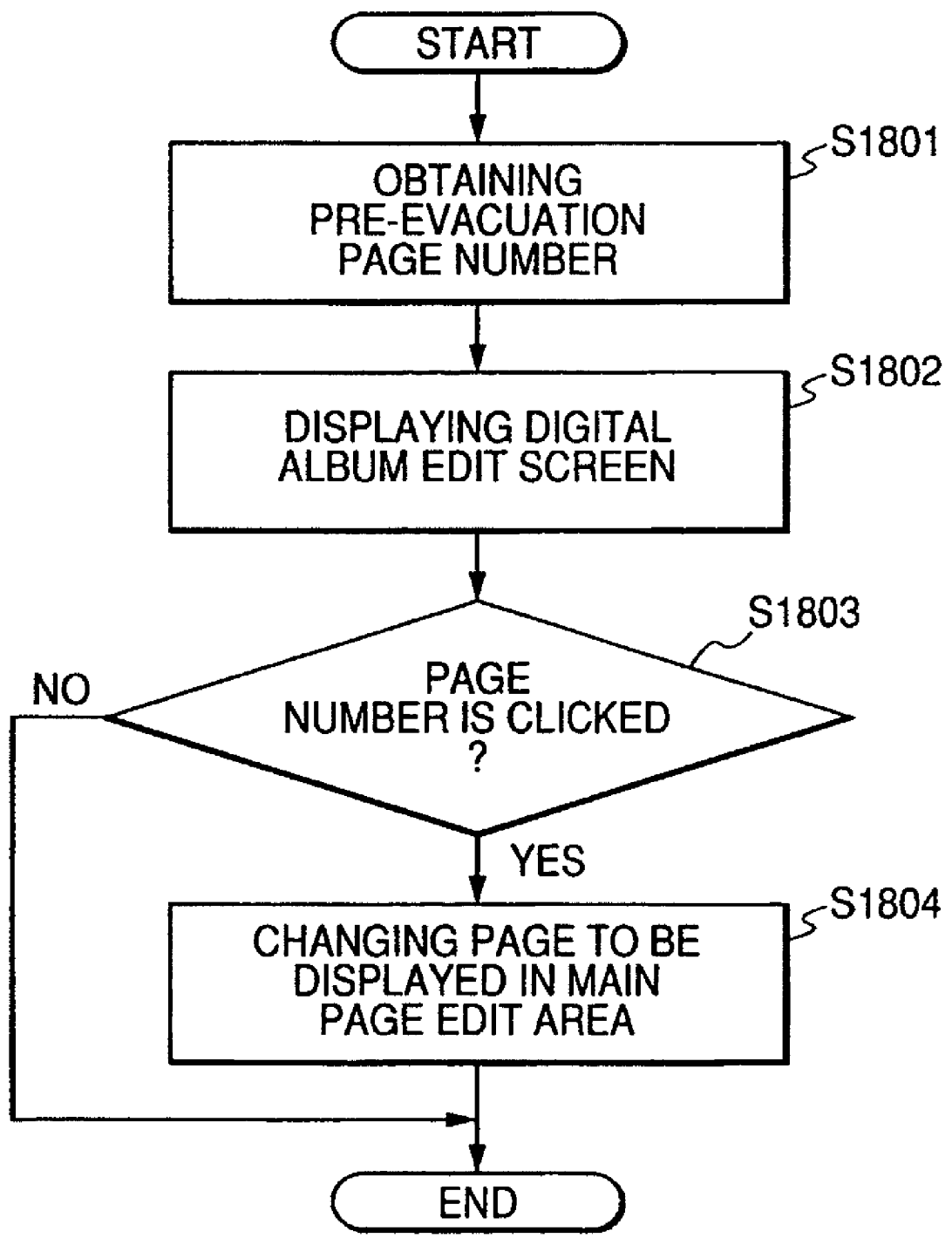
FIG. 18 is a flow chart showing a process of editing a digital album by executing a digital album editing program on a PC of the present invention.

In the following, the procedure will be explained with reference to FIG. 18.

A step S1801 reads and obtains, from the HDD 209, data on a page number in which the extrapaginal image data 307 were assigned before.

A step S1802 displays, in the evacuation image area 1102, the extrapaginal image data 307 together with the before-evacuation page number 1704, based on the data obtained in the step S1801. The evacuation image display area 1102 shown in FIG. 17 displays an image D that was assigned on pages 2 and 3 but is not assigned on pages by a subsequent editing operation, and images B and C that were assigned on pages 6 and 7 but are not assigned on pages by a subsequent editing operation.

A step S1803 discriminates whether a depressing operation on the before-evacuation page number 1704 has been executed by the user.

In case the step S1803 identifies that the depressing operation has been executed, a step S1804 displays a page of the before-evacuation page number 1704 in the main page editing area 1101. The images B and D, of which the before-evacuation page numbers 1704 belong to pages 6 and 7, are displayed in an emphasized manner in the evacuation image display area 1102.

The present embodiment, as explained above, allows to easily understand the page in which the image displayed in the evacuation area existed before, and to easily confirm the current layout of the page in which such image existed before.

Third Embodiment

In the present embodiment, there will be explained an operation, in the course of reading and executing a digital album editing program from the HDD 209 by the CPU 206 of the user PC 102 and in case the images designated by the user include mutually similar images, of positioning one of such similar images on a page of the digital album and positioning the remainder of the similar images in an evacuation area different from the page.

In the following, parts same as those in the first or second embodiment will not be explained and parts featuring the present embodiment only will be explained in detail.

Figure 19:
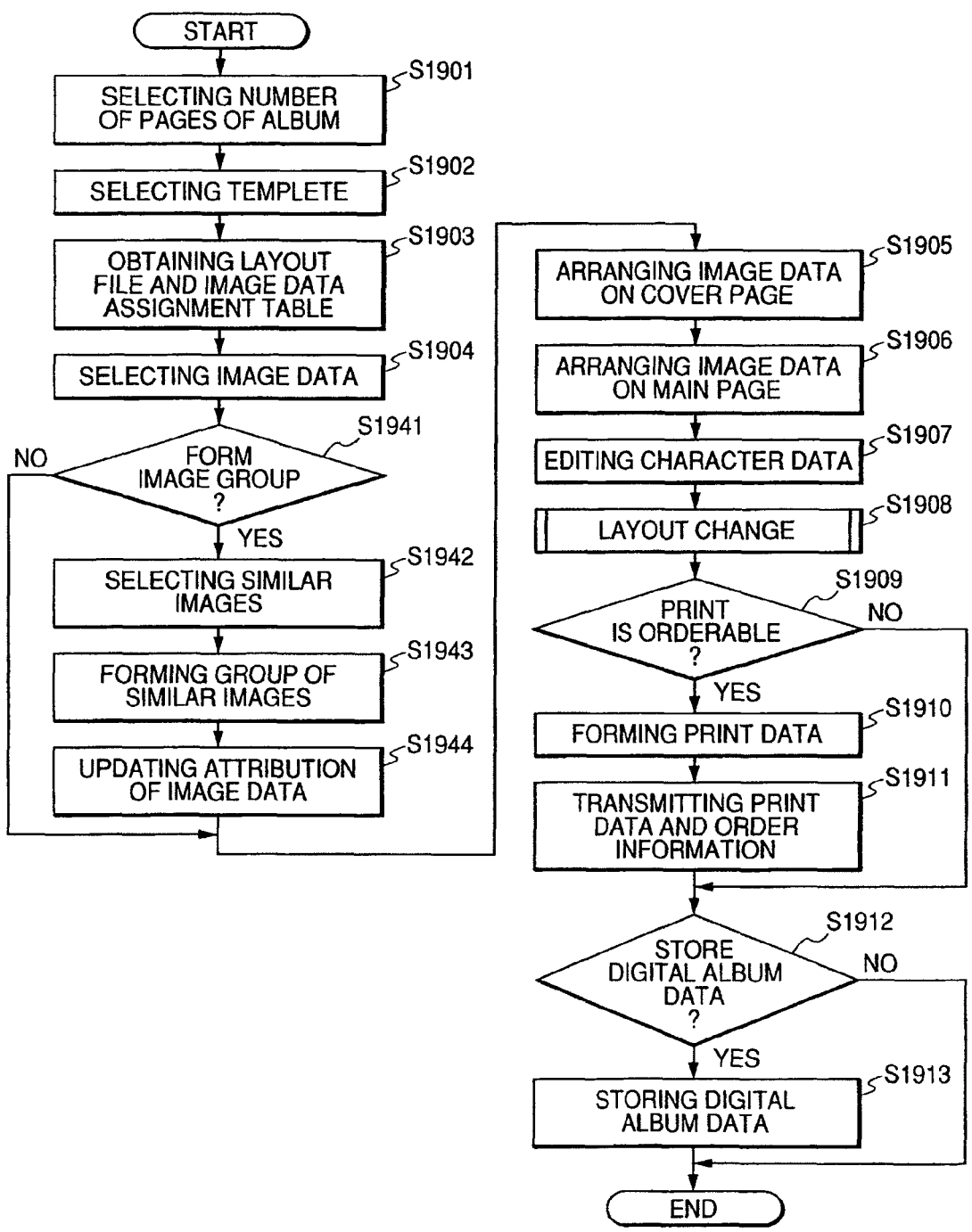
FIG. 19 is a flow chart showing a process of editing a digital album by executing a digital album editing program on a PC of the present invention.

FIG. 19 is a flow chart showing a process flow of editing a digital album by the CPU 206 of the user PC 102, by reading and executing a digital album editing program from the HDD 209.

At first there are executed processes of steps S1901-S1904, which are same as those of the steps S801-S804 of the first embodiment shown in FIG. 8.

Then a step S1941 discriminates whether or not to group similar image data, contained in the image data selected in the step S1904.

Figure 22:
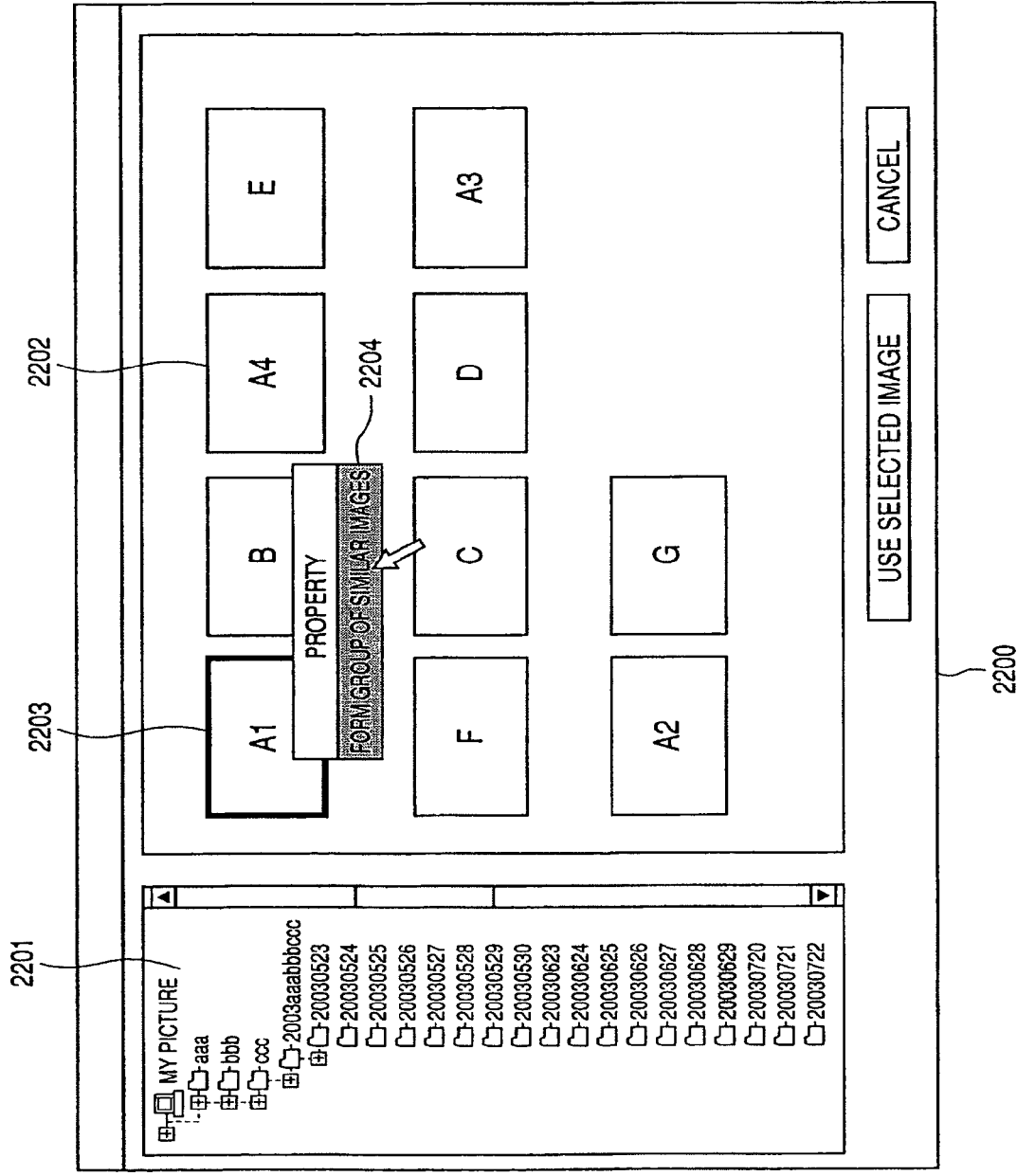
FIG. 22 is a view showing an image selecting frame of the present invention.

FIG. 22 shows an example of the image selecting frame displayed, in the step S1904, for selecting the images to be positioned in the digital album. The user enters following selections or instructions by using a pointing device on an image data selecting frame 2200. 2201 denotes a directory structure display area, for displaying a file directory structure of the HDD 209 of the user PC 102. The user selects a directory containing the image data to be used in the digital album, according to a display of the directory structure display area 2201. A thumbnail image display area 2202 is provided for a list display of thumbnail images of the image data present in the directory selected by the directory structure display area 2201. Among the thumbnail images displayed in the thumbnail image display area 2202, a thumbnail image 2203 of the image data A1 is emphasized by a frame line, indicating a selection by the user. An operation menu 2204 is displayed upon selecting the thumbnail image A1 on the thumbnail image display area 2202. When the user selects a menu item "grouping similar images" in the operation menu 2204, an instruction for a grouping of the image data similar to the image data A1 is identified.

A step S1942 searches image data, similar to the image data A1 corresponding to the thumbnail image A1, from the image data selected in the step S1904.

More specifically, image data having a photographing time within a predetermined range with respect to the photographing time of the image data A1 (for example within 5 minutes before or after the photographing time of the image data A1) are searched as the similar image data. Otherwise, image data containing a facial image matching the facial image extracted from the image data A1 are searched as the similar image data. Otherwise, as described in U.S. Pat. No. 6,400,853, similar image data are searched based on a feature amount of the image data A1. In the present embodiment, a searching method for the similar image data is not particularly restricted.

A step S1943 executes a grouping of the image data searched in the step S1942 and the image data A1 constituting the object of search. More specifically, the grouping can be achieved by giving each of the image data searched in the step S1942 and the image data A1 constituting the object of search an identifier for identifying a group to which such image data belong and storing such data in the HDD 209. The CPU 206 can judge the grouping of the image data by referring to the group identifier of the image data stored in the HDD 209. Otherwise, the grouping may be achieved by providing the HDD 209 with a table for grouping management, and storing an identifier for uniquely identifying the image data searched in the step S1942 and the image data A1 constituting the object of search. The CPU 206 can judge the grouping of the image data by referring to the group management table stored in the HDD 209.

Figure 23:
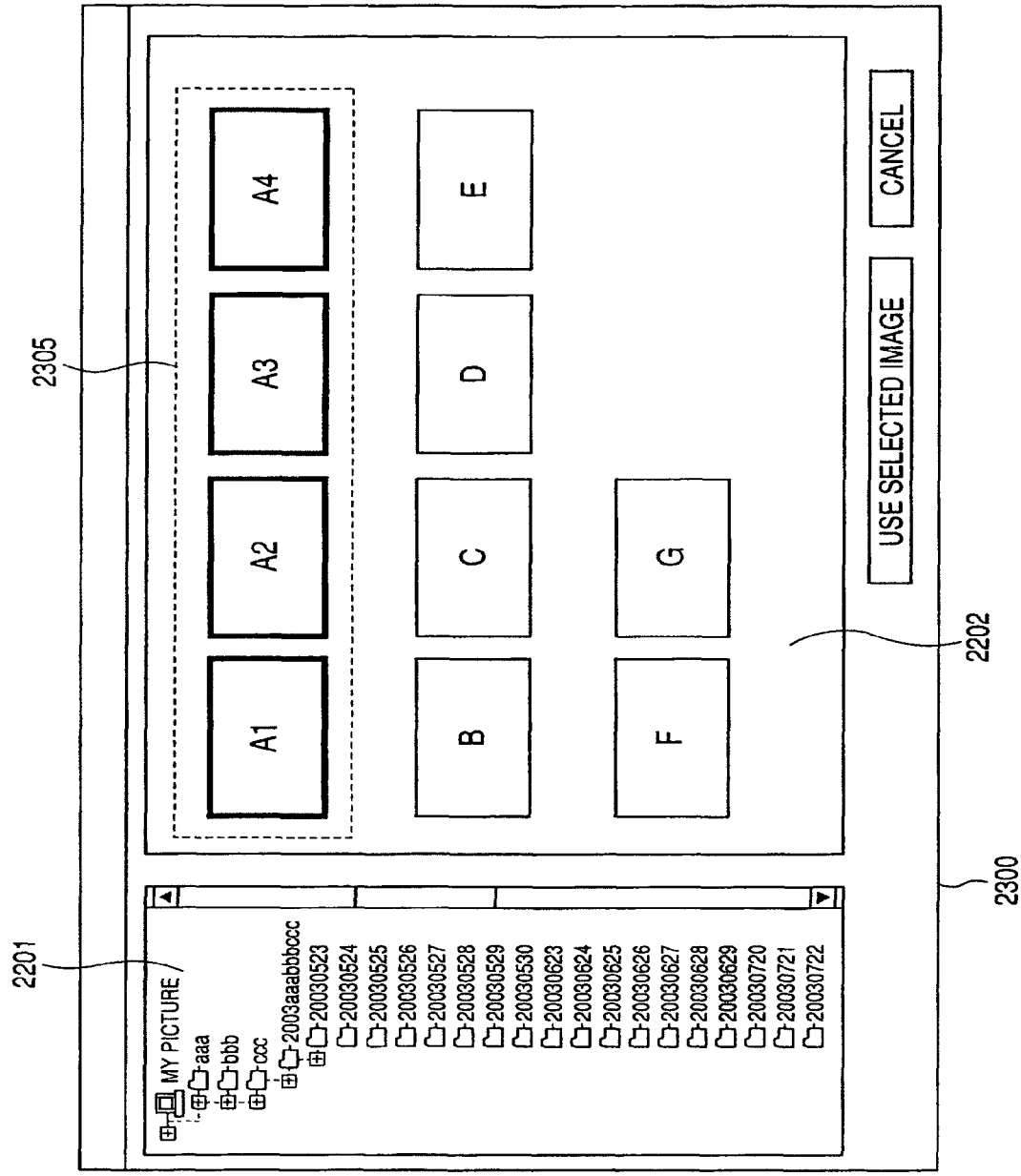
FIG. 23 is a view showing an image selecting frame of the present invention.

FIG. 23 shows an example of a similar image data search result frame 2300. A frame 2305 indicates that the image data A1-A4 are grouped as a result of search in the step S1942. The grouped image data are rearranged in the thumbnail image display area 2202, so as to be collected in the grouping frame 2305.

A step S1944 causes the data control unit 301 to renew the database, in such a manner that the image data A1 constituting the object of search become a representative of the similar image data and are managed as paginal image data 306, while the image data A2, A3 and A4*m* grouped with the image data A1 are managed as extrapaginal image data 307. Within the image data selected in the step S1902, those not grouped are processed as paginal image data 306. In the foregoing, the image data A1 constituting the object of search are automatically made the representative of the similar image data, but such method is not restrictive and the image data selected by the user from the grouped similar image data may be made the representative of the similar image data. Otherwise, within the grouped similar image data, those having a latest, earliest or intermediate photographing time may be selected as the representative of the similar image data.

Then there are executed processes of steps S1905-S1907, which are same as those of the steps S805-S807 of the first embodiment shown in FIG. 8.

Then a step S1908 executes a replacing process of the representative of the similar image data in each main page of the digital album with the grouped similar image data. Such replacing process of the similar image data will be explained in detail later, with reference to FIG. 20.

Then there are executed processes of steps S1909-S1913, which are same as those of the steps S809-S813 of the first embodiment shown in FIG. 8.

The digital album stored in the step S1913 has a configuration same as that of the first embodiment shown in FIG. 10. The present embodiment is particularly characterized in that the extrapaginal image data 1004 include similar image data that are not included in the page.

In the present embodiment, since the digital album data 1001 include the extrapaginal image data 307, the similar image data that are not included in the page at the re-editing of the digital album are also read and displayed in the evacuation image display area, whereby the similar image data that are not included in the digital album in the previous editing can be easily confirmed.

Figure 20:
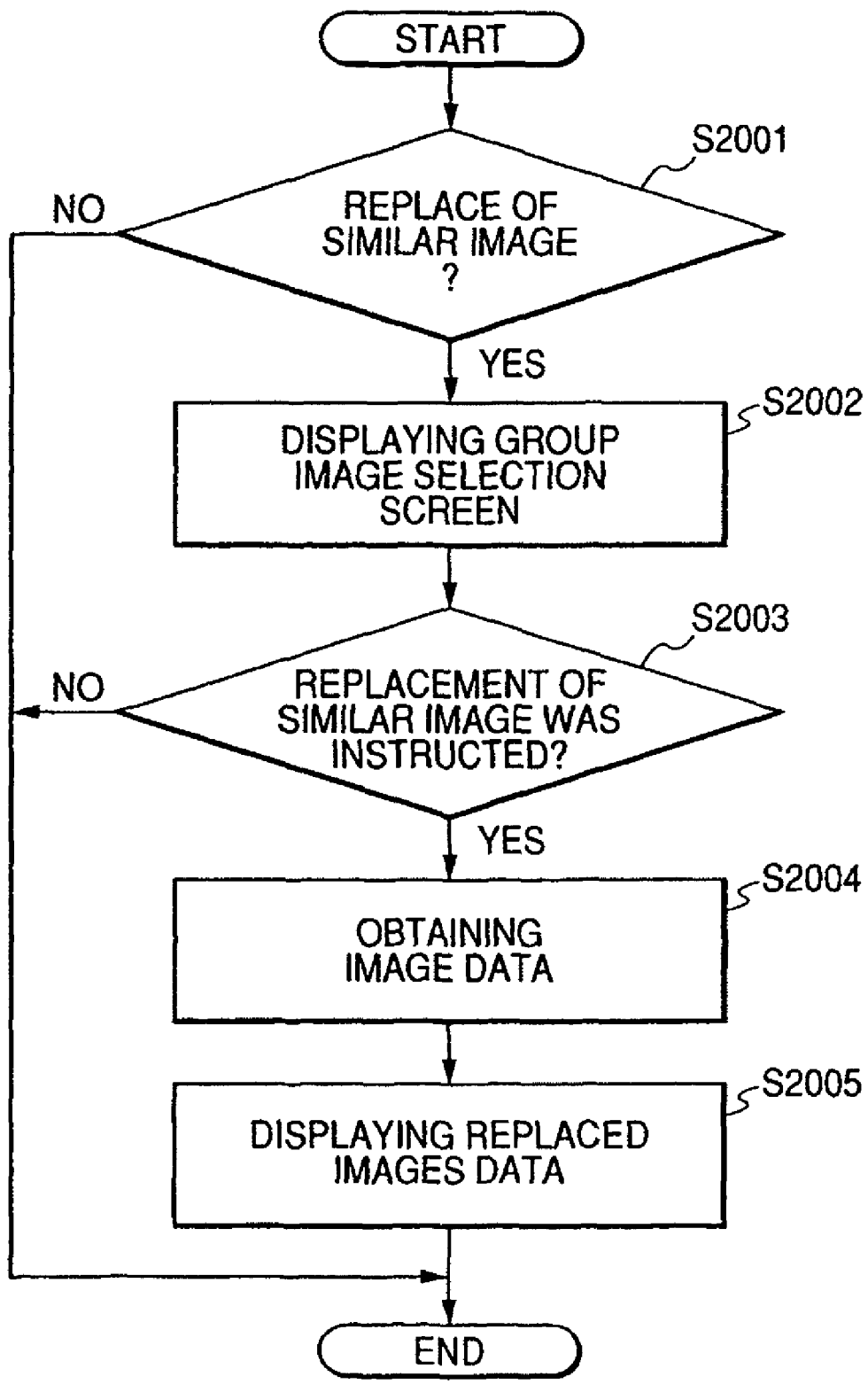
FIG. 20 is a flow chart showing a process of editing a digital album by executing a digital album editing program on a PC of the present invention.

FIG. 20 is a flow chart showing a similar image data replacing process to be executed in the step S1908 of the present embodiment, shown in FIG. 19.

A step S2001 discriminates whether a similar image data replacing process has been instructed.

Figure 21:
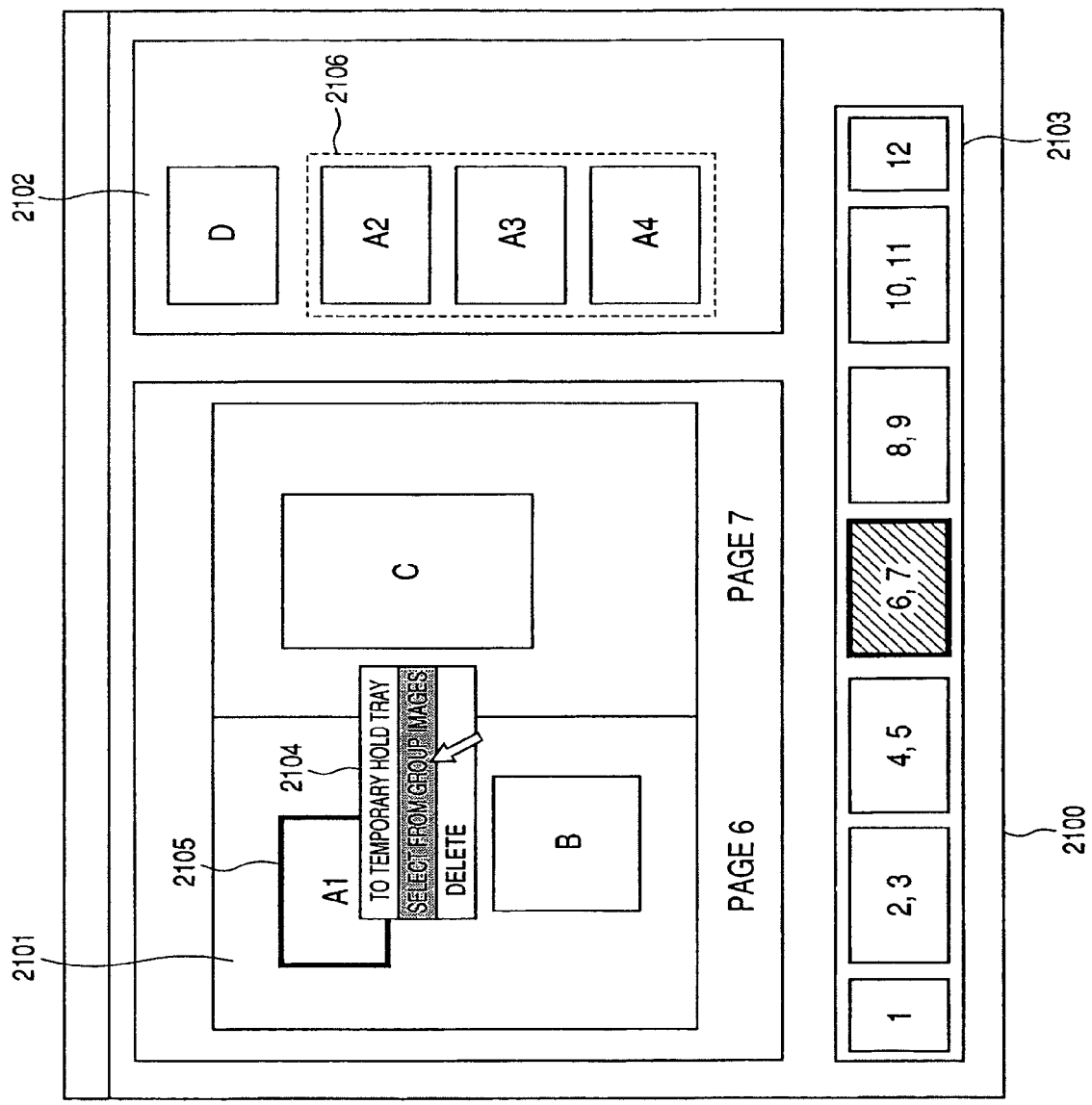
FIG. 21 is a view showing a digital album editing frame of the present invention.

FIG. 21 shows an example of a digital album editing frame 2100 displayed on the CRT 201 of the user PC 102. There are shown a main page editing area 2101 for displaying a page under editing; an evacuation image display area 2102 for displaying image data designated as the extrapaginal image data in the step S1944; and a page list display area 2103 for displaying all the page numbers contained in the digital album. In the page list display area 2103, a page under editing is made clear by an emphasized display of the page number of such page. FIG. 21 shows, as an example, a state where the main page under editing is pages 6 and 7, and, in the main page editing area 2101, image data A1, B and C are arranged according to 3-image layout data for the pages 6 and 7. Also page numbers of the pages 6 and 7 are displayed in an emphasized state in the page list display area 2103. Also the evacuation image display area 2102 displays an image D that is not assigned to the page as a result of the editing operation by the user, and image data A2, A3 and A4 assigned as extrapaginal image data 307 in the step S1944. The image data A2, A3 and A4 are surrounded by a similar image frame 2106. In an initial state of the digital album editing frame 2100 displayed in the step S1906, the evacuation image display area 2102 does not show the image data D but only include the image data A2, A3 and A4 assigned as extrapaginal image data 307 in the step S1944.

An instruction list 2104 is displayed in response to a right clicking operation of the pointing device 205 on the image data 2105 displayed in the main page editing area 2101. When "select from grouped image" is selected in the instruction list 2104, it is identified in the step S2001 that a similar image data replacing process has been instructed.

In the instruction list 2104, an item "select from grouped image" may be displayed only in case the selected image data 2105 have similar image data. Otherwise such item may be displayed even when the image data 2105 without similar image data are selected and in case an item "select from grouped image" is selected, the absence of the grouped image may be informed by a dialog or the like.

It is also possible, within the image data displayed on the main page editing area 2101, to execute an emphasized display on those having similar image data.

It is also possible, in response to the selection of the item "select from grouped image" in the instruction list 2104 displayed on the image data A1 (2105), to execute a highlighted display of the image data A2, A3 and A4 in the evacuation image display area 2102, grouped with the image data A1.

In FIG. 21, the page list display area 2103 only displays page numbers, but it is also possible display thumbnail image representing an image on each page.

Figure 24:
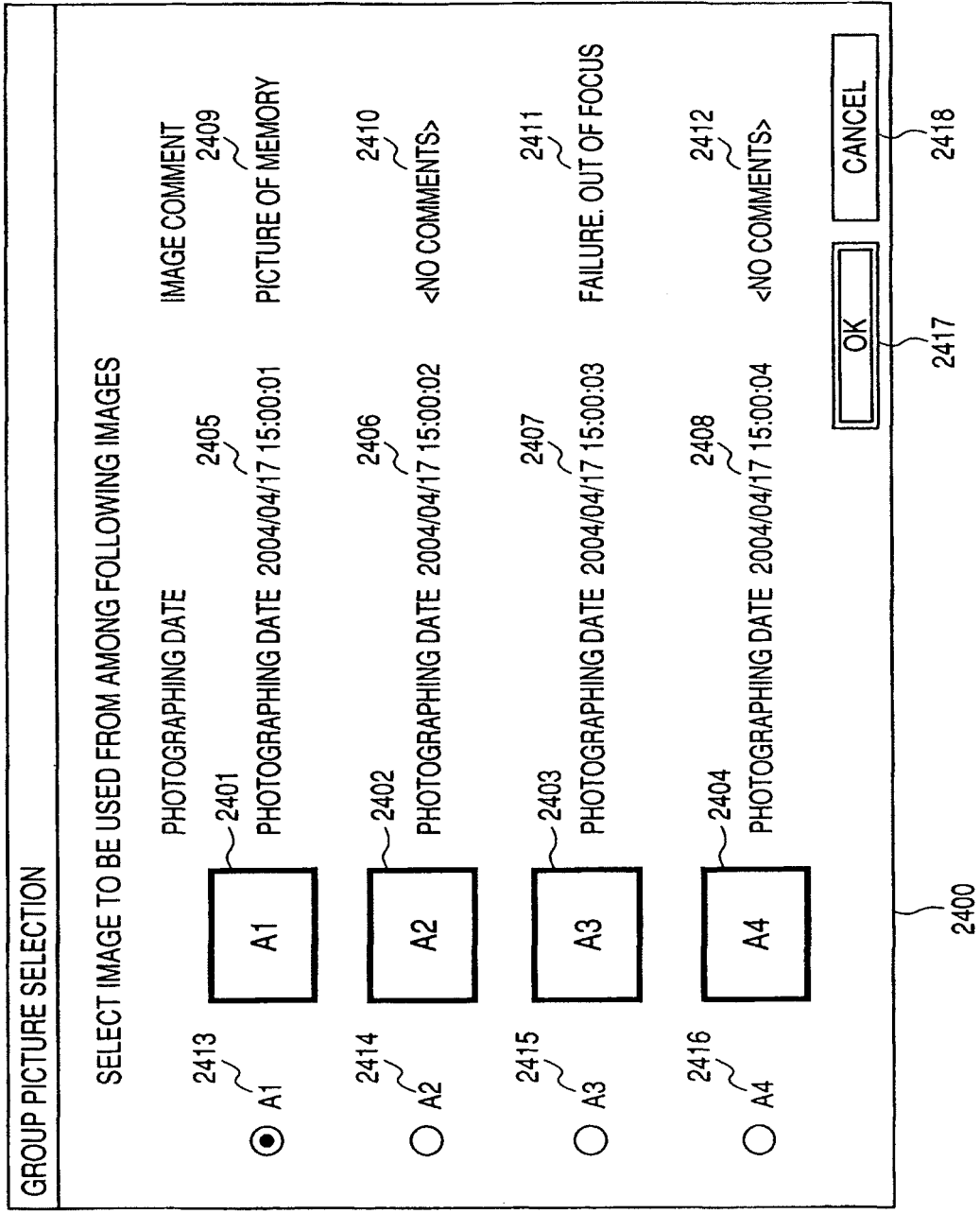
FIG. 24 is a view showing an image selecting frame of the present invention from grouped images.

In case the step S2001 identifies an instruction for a similar image data replacing process, a step S2002 displays a group image selecting frame 2400 as shown in FIG. 24. In FIG. 24, there are shown thumbnail images 2401-2404 of the grouped image data A1-A4; areas 2405-2408 for displaying photographing dates of the image data; areas 2409-2412 for displaying comments for the image data; and check boxes 2413-2416 for selecting an image to be assigned to the main page. As the image data A1 are currently assigned to the main page, the check box 2413 for the image data A1 is shown in a turn-on state. There are also provided an OK button 2417 for instructing a replacement of the image data corresponding to the turn-on check box among the check boxes 2413-2416 with the grouped image data currently assigned to the main page; and a cancel button 2418 for instructing a cancellation of the similar image data replacing process.

It is also possible, in response to a depressing operation by the user on the thumbnail images 2401-2404, to effect an enlarged display of the original image of the corresponding image data. This method allows an easier comparison of the images for the user.

A step S2003 discriminates whether an image replacement has been instructed.

In case the step S2003 identifies such instruction, a step S2004 obtains image data corresponding to the turned-on check box among the check boxes 2413-2416.

Then a step S2005 displays the image data, obtained in the step S2004, in the main page editing area 2101 as the representative of the similar image data, and displays the image data 2105, which are grouped with the above-mentioned image data and which have been displayed in the main page editing area 2101, in the evacuation image display area 2101.

In the evacuation image display area 2101, the grouped image data A2, A3 and A4 are surrounded by a similar image frame.

Figure 25:
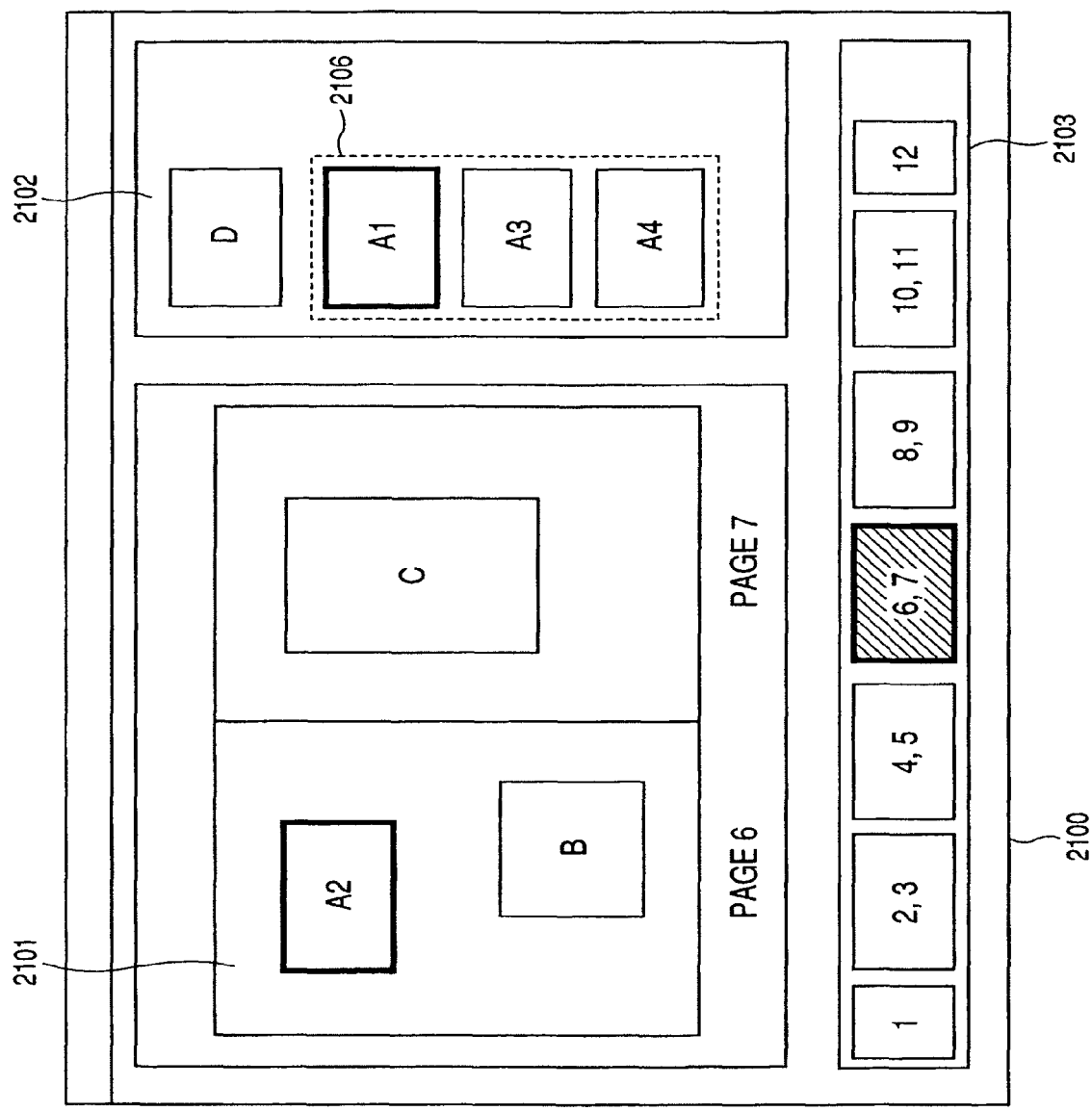
FIG. 25 is a view showing a digital album editing frame of the present invention.

FIG. 25 shows an example of the digital album editing frame 2101 after the image data replacement. In FIG. 25, the image data A2 are selected from the similar image data and displayed in the main page editing area 2101, in place for the image data A1 which were assigned to the main page and which are not displayed in the evacuation image area 2102.

Also the database is so renewed that the image data, which are shifted from the main page editing area 2101 to the evacuation image area 2102, are managed as extrapaginal image data 308, and that the image data, which are shifted from the evacuation image area 2102 to the main page editing area 2101, become the representative of the similar image data and are managed as paginal image data 307.

In the present embodiment, the image data for replacement are selected by the group image selecting frame 2400 as shown in FIG. 24, but such method is not restrictive, and, for example in response to a selection by the user of the image data A2 in the evacuation image area 2102 and a drag-and-drop operation into the main page editing area 2101, there may be executed a replacement of the image data A2 with the image data A1 which are grouped with the image data A2 and are displayed in the main page editing area 2101.

Figure 26:
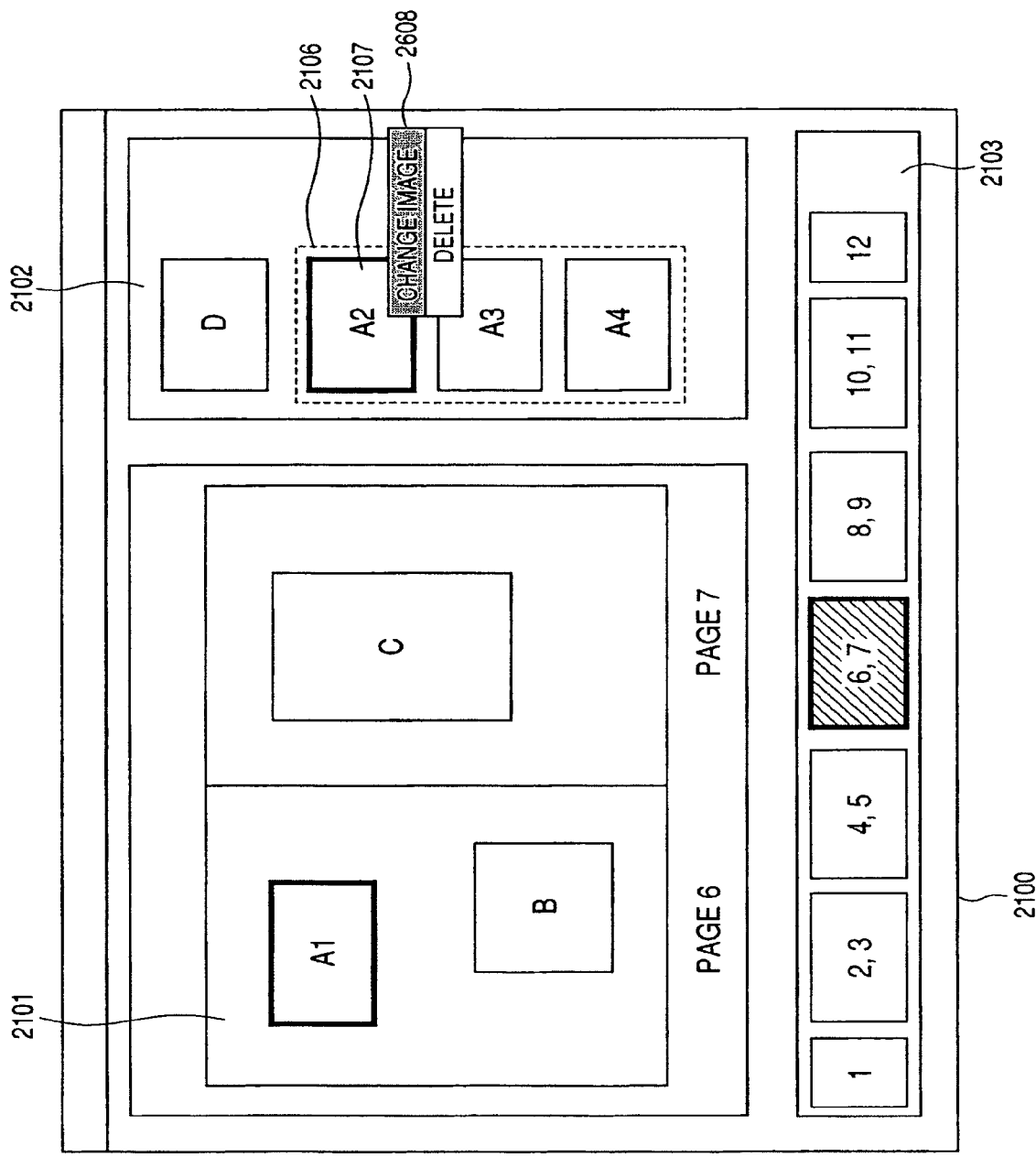
FIG. 26 is a view showing a digital album editing frame of the present invention.

Otherwise, as shown in FIG. 26, in response to a selection by the user of the image data A2 in the grouped image data in the evacuation image area 2102 and a selection of an item "change image" in a displayed instruction list 1608, there may be executed a replacement of the image data A2 with the image data A1 which are grouped with the image data A2 and are displayed in the main page editing area 2101.

Also in response to a selection by the user of any one of the similar image data displayed in the evacuation image area 2102, a page containing representative of the similar image data corresponding thereto may become a subject of the editing and may be displayed in the main page editing area 2101.

In the present embodiment, it has been explained that only one image data are positioned in the main page among the plural image data grouped as similar image data, but such number is not limited, and may be an arbitrary number designated by the user or may be an arbitrary number preset in the digital album editing program.

The present embodiment, as explained in the foregoing, allows to prevent, in case the images designated by the user to be included in the digital album include similar images, unnecessary inclusion of such similar images in the digital album.

The embodiments have been explained in an example of the digital album editing program, but the present invention is not limited to such case and is likewise applicable to a digital document editing program such as an editing program for a digital presentation or a digital document, constituted of plural pages and containing an image, a text, a pattern and the like in each page.

OTHER EMBODIMENTS

The objects of the present invention are naturally attained also by supplying a system or an apparatus with a recording medium storing program codes of a software realizing the functions of the aforementioned embodiments and by reading and executing, by a computer (or a CPU or an MPU) of such system or apparatus, the program codes stored in the recording medium. In such case, the program codes themselves read from the memory medium realize the functions of the aforementioned-embodiments, and the memory medium storing the program codes constitutes the invention.

The memory medium for supplying the program codes can be, for example, a floppy disk (trade name), a hard disk, an optical disk, a magneto optical disk, a CD-ROM, a CD-R, a magnetic tape, a non-volatile memory card, a ROM or a DVD.

The present invention also includes, not only a case where the computer realizes the functions of the aforementioned embodiments by executing the read program codes, but also a case where an OS (operating system) or the like functioning on the computer executes all the actual processes or a part thereof under the instructions of such program codes, thereby realizing the functions of the aforementioned The present invention further includes a case where the program codes read from the memory medium are once stored in a memory provided in a function expansion board inserted in the computer or a function expansion unit connected to the computer, and, under the instructions of such program codes, a CPU or the like provided in the function expansion board or the function expansion unit executes all the actual processes or a part thereof, thereby realizing the functions of the aforementioned embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application Nos. 2004-257256 and 2004-257257 filed on Sep. 3, 2004, which are hereby incorporated by reference herein.

What is claimed is:

1. An electronic album editing apparatus comprising:
    a retrieval unit that retrieves image data which are similar to each other, from a plurality of image data stored on a storage medium;
    a display control unit that controls a display to display a plurality of image data retrieved by the retrieval unit such that at least one of the plurality of retrieved image data is displayed as representative similar image data in an editing area corresponding to a page of an electronic album and the plurality of retrieved image data other than the representative similar image data, comprising similar image data, are displayed in an evacuation area which is provided independently of the page of the electronic album;
    a similar image designation unit that designates the similar image data displayed in the evacuation area; and
    a replacement instruction unit that inputs a replacement instruction of the similar image data designated by the similar image designation unit,
    wherein in response to the input of the replacement instruction, the display control unit controls the display to display the designated similar image data in the editing area and display the representative similar image data related to the designated similar image data in the evacuation area.

2. An apparatus according to claim 1, wherein the retrieval unit retrieves the image data which are similar to each other, on the basis of the photography date and time of the image data, a face image included in the image data, and a feature amount of the image data.

3. An apparatus according to claim 1, wherein the display control unit controls the display to display the representative similar image data separately from the other image data which are displayed in the editing area.

4. An apparatus according to claim 1, further comprising a similar image selection unit that selects the similar image data displayed in the evacuation area, wherein the electronic album includes a plurality of pages, and wherein the display control unit controls the display to display, in the editing area, the page of the electronic album which includes the representative similar image data related to the selected similar image data.

5. An apparatus according to claim 1, further comprising a generation unit that generates print data for printing the page in which the image data displayed in the editing area are arranged.

6. A control method of an electronic album editing apparatus, comprising:

retrieving image data which are similar to each other, from a plurality of image data stored on a storage medium;

controlling a display to display a plurality of image data retrieved in the retrieving step such that at least one of the plurality of retrieved image data is displayed as representative similar image data in an editing area corresponding to a page of an electronic album and the plurality of retrieved image data other than the representative similar image data, comprising similar image data, are displayed in an evacuation area which is provided independently of the page of the electronic album; and designating the similar image data displayed in the evacuation area; and inputting a replacement instruction of the similar image data designated by the similar image designation unit, wherein in response to the input of the replacement instruction, the controlling step includes controlling the display to display the designated similar image data in the editing area and display the representative similar image data related to the designated similar image data in the evacuation area.

7. A non-transitory computer-readable storage medium storing a program comprising a program code for causing a computer to execute the control method according to claim 6.

* * * * *